(12) United States Patent
Vlugt et al.

(10) Patent No.: US 10,108,618 B2
(45) Date of Patent: Oct. 23, 2018

(54) IMPLICITLY TRUSTED TRAVEL TOKEN AUTHENTICATION

(71) Applicant: Cubic Corporation, San Diego, CA (US)

(72) Inventors: Erik Vlugt, Poway, CA (US); Niosha Kayhani, Sutton (GB); Steffen Reymann, Reigate (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 15/595,192

(22) Filed: May 15, 2017

(65) Prior Publication Data

US 2017/0329777 A1 Nov. 16, 2017

Related U.S. Application Data

(63) Continuation-in-part of application No. 15/286,178, filed on Oct. 5, 2016.
(Continued)

(51) Int. Cl.
*G06K 9/00* (2006.01)
*G07C 9/02* (2006.01)
(Continued)

(52) U.S. Cl.
CPC .. *G06F 17/30032* (2013.01); *G06F 17/30002* (2013.01); *G06F 21/31* (2013.01);
(Continued)

(58) Field of Classification Search
CPC .... G06F 21/32; G06F 21/31; G06F 17/30032; G06F 17/30002; G06F 17/40; G07C 1/10;
(Continued)

(56) References Cited

U.S. PATENT DOCUMENTS 6,119,096 A * 9/2000 Mann ............... E05G 5/003
235/384
2002/0133380 A1 9/2002 Okayama et al.
(Continued)

FOREIGN PATENT DOCUMENTS

GB 2485442 A 5/2012
JP 2005-056166 A 3/2005
(Continued)

OTHER PUBLICATIONS

Sarkar et al., "Biometric ticketing System for Railway", Sep. 2014, International Journal of Latest Trends in Engineering and Technology (IJLTET), vol. 4 Issue 3 Sep. 2014, ISSN: 2278-621X, p. 90-92. (Year: 2014).*
(Continued)

*Primary Examiner* — Kevin H Flynn
*Assistant Examiner* — Brian A Tallman
(74) *Attorney, Agent, or Firm* — Kilpatrick Townsend & Stockton

(57) ABSTRACT

Embodiments of the invention(s) described herein enable a system that may rely on a biometric identifier entry validation system The validation system uses biometric methods such as facial recognition, palm veins, and thumb prints as an entry or passage token. The validation system associates a form of fare media such as a smartcard or other electronic payment method with the biometric identifier after repeated transactions where both the fare media and the biometric identifier are read. In this manner the biometric identifier becomes a biometric token that replaces the need to use a form of fare media. Accordingly, the biometric identifier user can be validated for passage without the need to carry a form of fare media and, in some cases, in different geographic locations.

20 Claims, 15 Drawing Sheets

Related U.S. Application Data

(60) Provisional application No. 62/337,162, filed on May 16, 2016, provisional application No. 62/350,110, filed on Jun. 14, 2016.

(51) Int. Cl.
| | |
|---|---|
| *G07B 15/00* | (2011.01) |
| *G06Q 20/40* | (2012.01) |
| *G06Q 10/02* | (2012.01) |
| *G06F 17/30* | (2006.01) |
| *G06F 21/31* | (2013.01) |
| *G07B 15/04* | (2006.01) |
| *G06F 21/32* | (2013.01) |
| *G06Q 20/10* | (2012.01) |
| *G07B 15/02* | (2011.01) |
| *G07C 9/00* | (2006.01) |
| *H04L 29/06* | (2006.01) |
| *G06F 17/40* | (2006.01) |

(52) U.S. Cl.
CPC .......... *G06F 21/32* (2013.01); *G06Q 10/025* (2013.01); *G06Q 20/1085* (2013.01); *G06Q 20/4016* (2013.01); *G06Q 20/40145* (2013.01); *G07B 15/02* (2013.01); *G07B 15/04* (2013.01); *G07C 9/00087* (2013.01); *G06F 17/40* (2013.01); *G07B 15/00* (2013.01); *H04L 29/06809* (2013.01); *H04L 63/0861* (2013.01)

(58) Field of Classification Search
CPC ......... G07C 9/00087; G06Q 20/40145; G06Q 10/02; G06Q 20/342; G06Q 10/025; G06Q 20/1085; G06Q 20/4016; G07B 15/00; G07B 15/02; G07B 15/04; H04L 63/0861; H04L 29/06809
See application file for complete search history.

(56) References Cited

U.S. PATENT DOCUMENTS

| | | |
|---|---|---|
| 2007/0206839 A1 | 9/2007 | Hanna |
| 2008/0027772 A1 | 1/2008 | Gernega |
| 2008/0175445 A1* | 7/2008 | Hu ...................... G06K 9/6298 382/118 |
| 2010/0066499 A1 | 3/2010 | Ishihara |
| 2010/0176198 A1 | 7/2010 | Delville |
| 2010/0332268 A1 | 12/2010 | Ohmori et al. |
| 2011/0208645 A1 | 8/2011 | Knauft |
| 2012/0117584 A1* | 5/2012 | Gordon ................ H04N 21/254 725/19 |
| 2013/0013527 A1* | 1/2013 | Takata ............... G07C 9/00087 705/325 |
| 2013/0046456 A1 | 2/2013 | Scofield |
| 2013/0344802 A1 | 12/2013 | Armour |
| 2014/0019177 A1 | 1/2014 | Smith |
| 2015/0213411 A1 | 7/2015 | Swanson et al. |
| 2015/0227923 A1 | 8/2015 | Kutsch |
| 2017/0358148 A1 | 12/2017 | Kayhani et al. |

FOREIGN PATENT DOCUMENTS

| | | |
|---|---|---|
| KR | 10-0891354 B1 | 4/2009 |
| WO | 99/06928 A1 | 2/1999 |
| WO | 03/034307 A1 | 4/2003 |
| WO | 2011/006142 A1 | 1/2011 |
| WO | 2016/025529 A1 | 2/2016 |
| WO | 2017201007 A1 | 11/2017 |

OTHER PUBLICATIONS

First Examiner Report dated Aug. 22, 2016 for Australian Patent Application No. 2013-290440; all pages.
International Search Report and Written Opinion dated Mar. 3, 2017 for International Patent Application No. PCT/US2016/055636; all pages.
International Preliminary Report on Patentability dated Feb. 26, 2015 for International Patent Application No. PCT/US2013/050548; all pages.
International Search Report and Written Opinion dated Jan. 21, 2015 for International Patent Application No. PCT/US2013/050548; all pages.
Morency, et al.; "Analysing the Variability of Transit Users Behaviour with Smart Card Data"; *2006 IEEE Intelligent Transportation Systems Conference*; Toronto, Ontario, Canada; Sep. 17-20, 2006; DOIT: 10.1109/ITSC/2006.170716; pp. 44-49.
International Search Report and Written Opinion dated Jul. 25, 2017 for International Patent Application No. PCT/US2017/032845; all pages.
Office Action dated Sep. 11, 2017 for U.S. Appl. No. 15/286,178; all pages.
U.S. Appl. No. 15/286,178, filed Oct. 5, 2016 received a Non-Final Office Action, dated Mar. 19, 2018, 24 pages.

* cited by examiner

IMPLICITLY TRUSTED TRAVEL TOKEN AUTHENTICATION

CROSS-REFERENCES TO RELATED APPLICATIONS

This application claims priority to U.S. Provisional Patent Application No. 62/337,162 filed May 16, 2016, entitled "IMPLICITLY TRUSTED TRAVEL TOKEN AUTHENTICATION," and is a continuation-in-part of U.S. Nonprovisional patent application Ser. No. 15/286,178 filed Oct. 5, 2016, entitled "MACHINE LEARNED BIOMETRIC TOKEN," which claims the benefit of priority to U.S. Provisional Patent Application No. 62/350,110, filed Jun. 14, 2016, entitled "MACHINE LEARNED BIOMETRIC TRAVEL TOKEN," the entire disclosure of each of which is hereby incorporated by reference, for all purposes, as if fully set forth herein.

BACKGROUND

Presenting fare media at a ticket gate causes a user backlog and also causes users to pass through the ticket gate at a less than maximal rate. This innovation is related to bypassing the standard fare media presentation at the ticket gate using biometric identifiers associated with the fare media.

BRIEF SUMMARY

One embodiment of the present invention is a computer processor implemented method of biometric identifier validation at an entry system comprising registering a biometric identifier with a fare media. This method further comprises: receiving a fare media presentation from a fare media reader at a first time and at a first geographical location; receiving a first biometric identifier from a biometric identifier reader at the first time and at the first geographical location; associating the fare media with the first biometric identifier; comparing the first biometric identifier with stored biometric identifiers associated with the fare media; determining the first biometric identifier matches stored biometric identifiers; storing the first biometric identifiers with the stored biometric identifiers; storing the association with the fare media; storing the fare media; incrementing a match count; and determining the match count exceeds a threshold count. This method also comprises: receiving a second biometric identifier at a fare media reader at a second time at a second geographical location; retrieving fare media data corresponding to the second biometric identifier; validating the fare media for entry into an entry system; and in response to validating the fare media, allowing the user corresponding to the second biometric identifier to enter the entry system. This method could include that the entry system is for a transit system, entertainment venue, sporting venue, multi-family residence, or a personal services venue. This method could also include that the biometric identifier is one of a fingerprint, palm veins, facial characteristics, DNA, a palm print, hand geometry, an iris, or a retina. The method could additionally have the first geographic location and the second geographic location be co-located or the first geographic location and the second geographic location be not co-located. In this method the second biometric identifier could be added to the stored biometric identifiers. And this method could also further comprise determining the first biometric identifier does not match stored biometric identifiers, and deleting the stored biometric identifiers.

A second embodiment of the present invention is a non-transitory computer-readable medium having sets of instructions stored thereon for biometric identifier validation in an entry system which, when executed by a computer, cause the computer to perform the actions including registering a biometric identifier with a fare media. Other actions include: receiving a fare media presentation from a fare media reader at a first time and at a first geographical location; receiving a first biometric identifier from a biometric identifier reader at the first time and at the first geographical location; associating the fare media with the first biometric identifier; comparing the first biometric identifier with stored biometric identifiers associated with the fare media; determining the first biometric identifier matches stored biometric identifiers; storing the first biometric identifiers with the stored biometric identifiers; storing the association with the fare media; storing the fare media; incrementing a match count; and determining the match count exceeds a threshold count. More actions include: receiving a second biometric identifier at a fare media reader at a second time at a second geographical location; retrieving fare media data corresponding to the second biometric identifier; validating the fare media for entry into an entry system; and in response to validating the fare media, allowing the user corresponding to the second biometric identifier to enter the entry system. This embodiment could include that the entry system is for a transit system, entertainment venue, sporting venue, multi-family residence, or a personal services venue. This embodiment could also include that the biometric identifier is one of a fingerprint, palm veins, facial characteristics, DNA, a palm print, hand geometry, an iris, or a retina. The embodiment could additionally have the first geographic location and the second geographic location be co-located or the first geographic location and the second geographic location be not co-located. In this embodiment the second biometric identifier could be added to the stored biometric identifiers. And this embodiment could also include actions determining the first biometric identifier does not match stored biometric identifiers, and deleting the stored biometric identifiers.

One embodiment of the present invention is a system for biometric identifier validation in an entry system, the system comprising registering a biometric identifier with a fare media. This system further comprises: receiving a fare media presentation from a fare media reader at a first time and at a first geographical location; receiving a first biometric identifier from a biometric identifier reader at the first time and at the first geographical location; associating the fare media with the first biometric identifier; comparing the first biometric identifier with stored biometric identifiers associated with the fare media; determining the first biometric identifier matches stored biometric identifiers; storing the first biometric identifiers with the stored biometric identifiers; storing the association with the fare media; storing the fare media; incrementing a match count; and determining the match count exceeds a threshold count. This system also comprises: receiving a second biometric identifier at a fare media reader at a second time at a second geographical location; retrieving fare media data corresponding to the second biometric identifier; validating the fare media for entry into an entry system; and in response to validating the fare media, allowing the user corresponding to the second biometric identifier to enter the entry system. This system could include that the entry system is for a transit system, entertainment venue, sporting venue, multi-family residence, or a personal services venue. This system could also include that the biometric identifier is one of a fingerprint, palm veins, facial characteristics, DNA, a palm print, hand geometry, an iris, or a retina. The system could additionally have the first geographic location and the second geographic location be co-located or the first geographic location and the second geographic location be not co-located. In this system the second biometric identifier could be added to the stored biometric identifiers. And this embodiment could also further comprise determining the first biometric identifier does not match stored biometric identifiers, and deleting the stored biometric identifiers.

BRIEF DESCRIPTION OF THE DRAWINGS

The present disclosure is described in conjunction with the appended figures.

Figure 1:
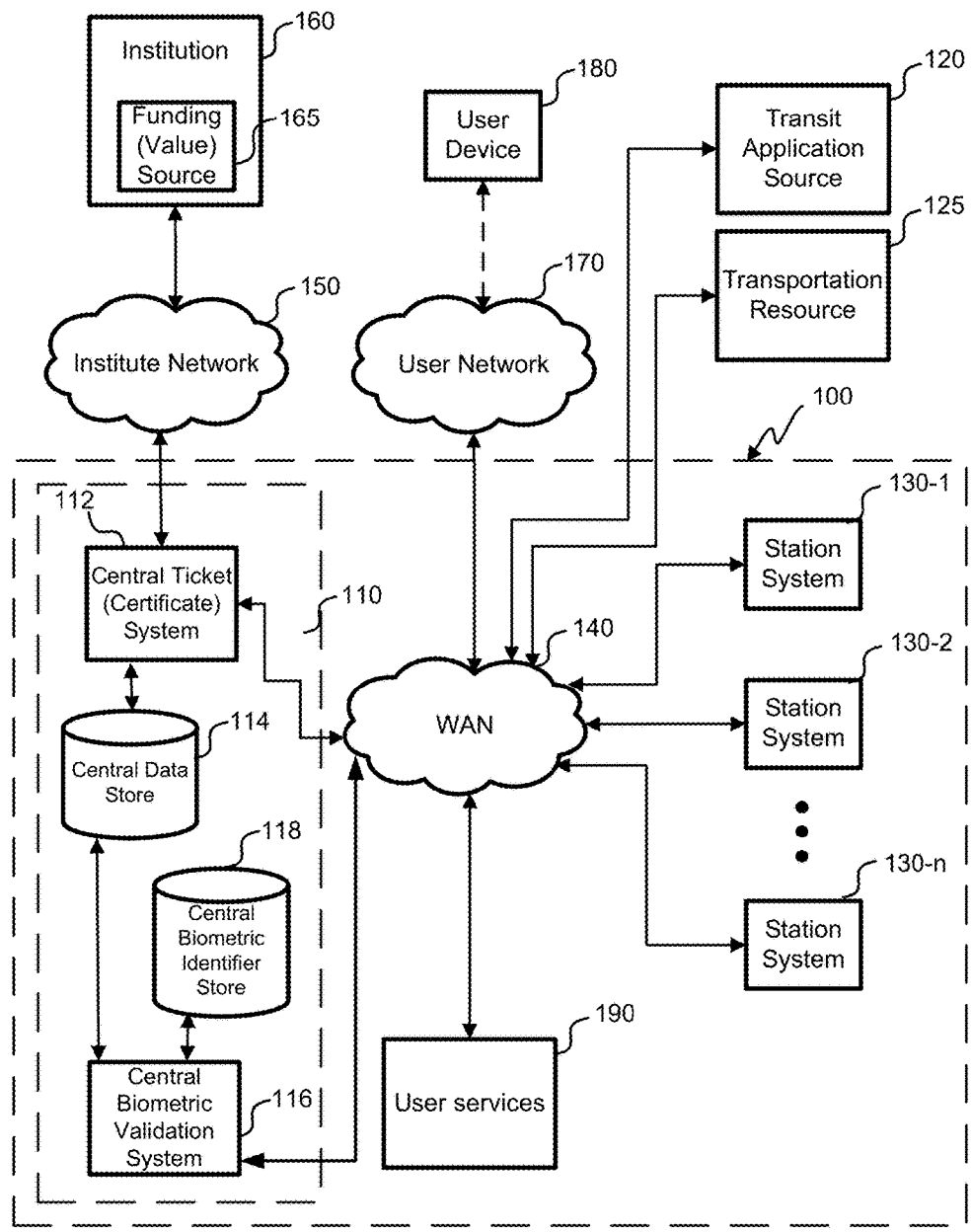
FIG. 1 is a block diagram of an embodiment of a transit system.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, for the purposes of explanation, numerous specific details are set forth in order to provide a thorough understanding of various embodiments. It will be apparent, however, to one skilled in the art that various embodiments may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosed systems and methods as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Biometric data is generally considered to be metrics that are related to human characteristics. Biometrics authentication is a method used in conjunction with characteristic recognition and computer processing as a form of identification and access control. Such a biometric identifier becomes a travel token that can be used in place of forms of fare media. Biometric identifiers can be distinctive, measurable characteristics used to identify, label, and describe an individual. Biometric identifiers are often categorized as physiological versus behavioral characteristics. These biometric physiological characteristics can be typically related to the shape of the body. Some examples include, but are not limited to fingerprint, palm veins, face recognition, DNA, palm print, hand geometry, iris recognition, retina recognition, as well as an individual's odor and scent. Some biometric behavioral characteristics can be related to an individual's behavior patterns, including but not limited to typing rhythm, gait, and voice. Proper biometric use is very application dependent. Certain biometrics will be better than others based on the required levels of convenience and security. No single biometric will meet all the requirements of every possible application. This specification may refer to one of these such as facial recognition, fingerprint identification, retina identification, iris identification, palm print identification, and/or vein identification, but one of skill in the art will realize that any biometric characteristic suitable for this application could be used in place of facial recognition.

Biometric authorization replaces the more traditional means of access control that typically can include token-based identification systems, such as a smartcard, a fare card, a smart phone with application, an issued ticket, a driver's license, passport, or other form of government issued identification, and knowledge-based identification systems, that can include such things as passwords or personal identification numbers. Since biometric identifiers are unique to individuals, they can be considered, in most cases, to be more reliable in verifying identity than token and knowledge-based methods.

Embodiments of the invention(s) described herein enable a system that may rely on a biometric identifier entry validation system. The validation system uses biometric methods such as facial recognition, palm veins, thumbprints, fingerprints, or any other biometric identifier as an entry or passage token once validated with a fare media. Thus, the validation system becomes more efficient and recognizes a user faster after collecting user data and an associated biometric identifier for a predetermined number of transactions.

The advantages of the using the biometric authentication in the present invention can include, for example: a more secure travel token compared to all other current fare media, media that cannot be stolen or forged; no requirement for users to carry any form of fare media; allowing scalability of biometric identification database sizes; allowing for a quicker biometric identification using machine learning.

Generally biometric authentication is a two-step process comprising a verification step and an identification step. In the first step, the validation system associates an individual or fare media (FM) with a biometric characteristic of the individual or user of the FM. In the identification step the validation system performs a one-to-many comparison against a biometric database in an attempt to establish the identity of an unknown individual. The system will succeed in identifying the individual if the comparison of the biometric sample to a biometric identifier in the database falls within a previously set threshold. In the present invention, an additional step of a associating a valid FM with the biometric identifier for a pre-determined number of times is performed before allowing the biometric identifier to be a substitute for producing a FM for passage. Additionally—if at any time the biometric identifier does not match the existing FM data—all biometric data stored with the FM is deleted and the verification process must begin anew.

The present invention presents a variety of novel concepts that include: adding and linking biometric detection capability to existing FM validation; storing biometric identifiers with FM records; linking biometric identifiers to more than one FM; and creating trusted links between biometric identifiers and FMs to facilitate future validation based on reading only the biometric identifier. Furthermore, the invention contemplates certain safeguards—such as requiring a configurable number of biometric validations before allowing passage by biometric identifiers alone and the option to remove all biometric identifiers from a FM record in the case that biometric identifier does not match the record. The advantages over traditional FM systems are numerous and include that biometric identifiers do not have to be associated with a user—only a FM such that the FM user's identification can be kept private. Other advantages contemplated are faster passage through a fare gate without holding the FM itself. And all of this is accomplished in the present invention without changing the back office operation (or the central ticketing system).

FIG. 1 illustrates a block diagram of an embodiment of a transit system 100, in communication with other systems. The transit system 100 can be used with any desired form of transit including, for example, subway, bus, ferry commuter rail, rail, para-transit, airplane, etc., or any combination thereof, and can be used to coordinate and/or control the operation of the other systems in providing services, including, transportation services.

The transit system 100 can include a central control system 110. The central control system 110 can include one or more servers and/or other computing systems having processors, memories, and network interfaces for processing and communicating information.

In the specific embodiment shown in FIG. 1, the central control system 110 can include a central certificate system 112. The central certificate system 112 can comprise one or more servers and/or other computing systems having processors, memories, and network interfaces for processing and communicating information. In some embodiments, the central certificate system 112 can be configured to provide information, receive information, and/or to track information relating to ticketing. In some embodiments, the central certificate system 112 can store information within a central data store 114. This information can include biometric identifiers. It will be recognized that such a transit system 100 can be enabled for use in applications beyond transit, such as transportation systems (e.g., airline systems, car rental systems, etc.), building entry, and event entry.

In another embodiment shown in FIG. 1, the central control system 10 can include a central biometric validation system 116. One of skill in the art can recognize that central biometric validation system 116 could be included in certificate system 112. The central biometric validation system 116 can be connected to wide area network 140. Through wide area network 140 the central biometric validation system 116 can communicate with station systems 130. The central biometric validation system 116 can also be connected to central data store 114 so that it can share data with the certificate system 112. The central biometric validation system 116 can also be connected to a central biometric identifier store 118. One of skill in the art can recognize that the central biometric identifier store 118 could be included in the central data store 114. The central biometric identifier store 118 may store system-wide biometric identifiers that are sent to the station systems 130 in time periods that correspond to the learned time periods that the account holder or fare card associated with the biometric identifier is predicted to pass through the station system 130. They may also be retrieved by station system 130 in other embodiments.

The central biometric validation system 116 may predict when to send a biometric identifier to station system 130 in various ways. First—an account holder may enter predicted times when the holder will be at a station when creating or updating their account either at a TV machine 212 shown in FIG. 2, with a user device 180, or a non-user device or other methods. The account holder can also input the holder's biometric identifier using many methods including scanning thumbprints, taking a facial picture, taking a thumbprint picture, taking a palm print picture, or any other number of ways of inputting biometric characteristics. Thus, the central biometric validation system 116 knows what biometric identifier to retrieve from the central biometric identifier store 118 associated with the account holder to send to station system 130 and when to send it.

In another embodiment the central biometric validation system 116 may learn when to send the biometric identifier associated with an account holder. The central biometric validation system 116 may receive a biometric identifier associated with an account holder when the account holder presents FM 250 (FIG. 2) to pass through a fare gate (FG) 260 at station system 130. Once the central biometric validation system 116 determines that the same FM 250 holder is presenting the FM 250 associated with the same biometric identifier at the same station system 130 at the same time for a predetermined number of occurrences—the central biometric validation system 116 alerts station system 130 that it has "learned" this information so that the FM 250 holder is notified that the holder no longer needs to present FM 250 to pass through an FG 260 for the length of time left on FM 250—or alternatively use a different ingress point allocated for biometric identification. One of skill in the art can appreciate that there are many variations of this idea including FM 250 that are value based such that as long as there is vale left on the FM 250 the holder can pass using only biometric identification in some circumstances.

In yet another embodiment the central biometric validation system 116 can also learn to send the biometric identifier associated with a FM 250 such as a purchased monthly pass. The central biometric validation system 116 may receive a biometric identifier associated with the FM 250 when the account holder presents the FM 250 to pass through an FG 260 at station system 130. Once the central biometric validation system 116 determines that the same account holder is presenting the FM 250 associated with the account holder at the same station system 130 at the same time for a predetermined number of occurrences—the central biometric validation system 116 alerts station system 130 that it has "learned" this information so that the account holder is notified that the holder no longer needs to present FM 250 to pass through an FG—or alternative use a different ingress point allocated for biometric identification The transit system 100 can include one or several station systems 130. In some embodiments, the station system 130 can comprise one or several systems and/or devices located within the station and/or within a mobile environment, which systems and/or devices can be used for ticketing and/or access control. Station systems 130 can gather information regarding transactions and communicate the information to the central certificate system 112 using a wide area network 140. The wide area network 140 can include one or more networks, such as the internet, which one or more networks may be public, private, or a combination of both. The wide area network 140 can be packet-switched or circuit-switched connections using telephone lines, coaxial cable, optical fiber, wireless communication, satellite links, and/or other mechanisms for communication. Communication between the station systems 130 and the central control system 110 may be in real time or periodic. Thus, the usage of FM 250 throughout the transit system 100 can be tracked and associated with the corresponding biometric identifier of the FM 250 holder. In one embodiment biometric identifiers can be communicated from the central certificate system 112 to the station system 130 via the wide area network 140. In other embodiments, changes in schedules, ticket prices, and delay notifications can be communicated from the central certificate system 112 to the station systems 130 via the wide area network 140. In yet other embodiments the station system 130 my retrieve biometric identifiers to validate a user without a FM. In such cases the biometric identifier is used to identify the user as a valid use of the associated FM that can validate passage or entry.

In some embodiments, the transit system 100 can include a user services 190 that can be maintained and/or provided by the transit service provider of the transit system 100. In some embodiments, the user services 190 can comprise a call center and/or any other source of user support and/or service.

The user can be identifiable and/or identified by the transit system 100. In some embodiments, the user can have, for example, a user account. The user account can comprise information regarding a certain user of the transit system 100, such as a name, address, phone number, email address, user identification (such as a unique identifier of the user or other user ID), passcode (such as a password and/or personal identification number (PIN)), an identification code associated with a FM 250 used to identify a user and/or a transit user account (such as a primary account number (PAN)), information regarding user preferences and user opt-in or opt-out selections for various services, product(s) associated with the transit user account, a value and/or credit associated with the product(s), information regarding a value source for the transit user account, and more. The user's biometric identifier can be pre-populated in the user account in one embodiment. In yet another embodiment the user's biometric identifier is associated with the user account once the validation system associates the user with the associated biometric identifier.

The user may request a user account and provide the information listed above by phone (such as a call to the user services 190 maintained and/or provided by the transit service provider of the transit system 100), on the Internet, at ticket booth, at a ticket vending machine, or by other means. The central certificate system 112 can use the information provided by the user to create the user account that can be stored and/or maintained on a database, such as the central data store 114 of the central control system 110.

In some embodiments, the transit system 100 can complete a transaction with the value source 165 via an institution 160. In some embodiments, this transaction can occur via institute network 150, and in some specific embodiments, the central certificate system 112 can communicate with an institute network 150 to complete a transaction with the value source 165

In some embodiments, transit system 100 can communicate with one or several users operating a user device 180. The user device 180 may be communicatively coupled with the central control system 110. Such a user device 180 may be a smart phone or other mobile phone (including a near-field-communication enabled mobile phone), a tablet personal computer (PC), a personal digital assistant (PDA), an e-book reader, wearable device or other device. In transit system 100, a communicative link from user device 180 to central certificate system 112 can be provided by a user network 170 in communication with wide area network 140. User device 180 can thereby communicate with the central certificate system 112 to access and/or manage information of a user account. Furthermore, the central certificate system 112 can send messages to the user device 180, providing transit, account, and/or other information to a user of the transit system 100 in possession of the user device 180. Such messages may be based on, among other things, opt-in or opt-out selections and/or other user preferences as stored in a user account. In some embodiments, the user network 170 can comprise any type of communications including Bluetooth, local area network, intranet, wired internet, wireless internet, mobile communication network including, for example, cellular network, radio network, and/or the like.

A user can use the user device 180 to download a transit application from a transit application source 120. The transit application source 120 may be an application store or website provided by a mobile carrier, the hardware and/or software provider of the user device 180, and/or the transit service provider. The transit application can be uploaded or otherwise provided to transit application source 120 by the transit service provider. According to some embodiments, the transit application can provide additional functionality to the user device 180, including enabling a near field communication (NFC)-enabled user device to be used as FM 250 and access control points of the transit system 100. The transit application can also allow the user to input one or more biometric identifiers including a facial picture, thumb print, palm print or any other biometric identifier. A user can access and/or use the transit system 100 in a variety of ways. In some embodiments, for example, the user can access the transit system 100 via the user device 180 and/or via one or several of the station systems 130.

Figure 2:
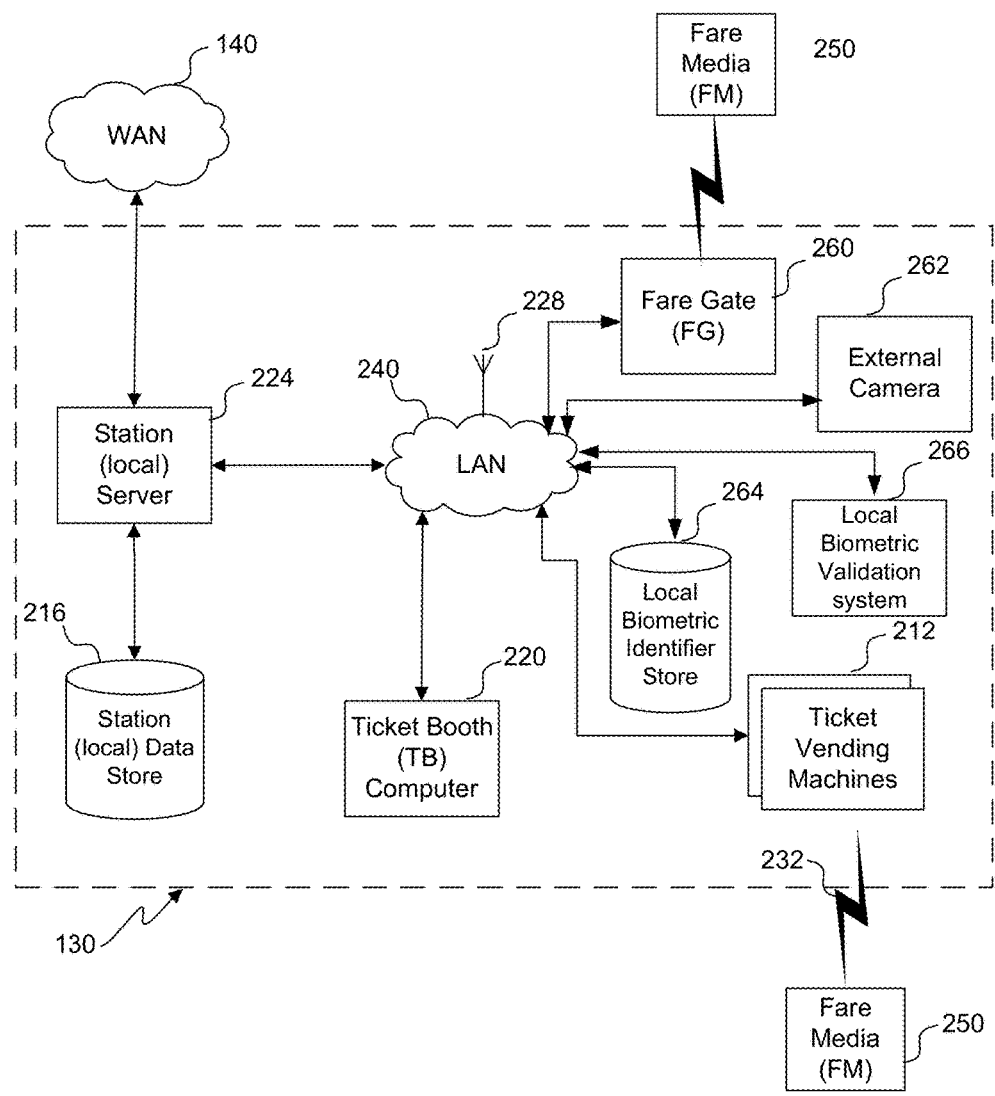
FIG. 2 is a block diagram of an embodiment of a station system.

FIG. 2 shows a block diagram of an embodiment of a station system 130. In some embodiments, the station system 130 can control ticketing operations and/or other operations relating to and/or involving the transit system 100. In some embodiments, the station system 130 can be associated with a specific geographic location such as, for example, a train station, an airport, a subway station, a bus station, a dock, a harbor, a retail location and/or any other location, and in some embodiments, the station system 130 can be associated with a mode of transit such as, for example, a bus, train, taxi, a boat, ferry, an airplane, a lift, and/or any other mode of transit.

Because different forms of transit may require different functionality, various station systems 130 may have some or all of the components shown in the block diagram. The components of the station system 130 can be communicatively linked to each other so as to allow the sending and receiving of information between the components of the station transit system 130. In some embodiments, this link can comprise a wired and/or wireless network. In the embodiment shown in FIG. 2, the components of the station system 130 can be linked by a local area network 240. The local area network 240 10 couple the various systems together and can include point-to-point connections, packet switched connections, wireless connections, and/or other networking techniques.

The station transit system 130 can include a local server 224 that can be coupled to the wide area network 140 to allow communication with the central certificate system 112. Processing of local information can be performed on the local server 224. For example, fare information, schedule information, delay update information, and other transit related information can be processed at the local server 224 and communicated to the various other machines in the transit system 100.

A ticket booth (TB) computer 220, and ticket vending machines (TV machines) 212 can communicate with the central certificate system 112 through the station computer server 224 or directly with the central certificate system 112 through local area network 240 or wide area network 140 (e.g., the Internet).

The TV machines 212, and one or more TB computers 220, can communicate with the local server 224 via the local area network 204. This communication can be transmitted via a physical connection or wireless connection via one or more antennas 228. Transactions at access control points 208, TV machines 212, and one or more TB computers 220 can be communicated to the local server 224, stored at local data store 216, and/or transmitted to central ticketing system, which can update information in a transit user account accordingly.

Fare Gate (FG) 260 also communicates with local area network 240 to the transit system 100 and can also communicate over the wide area network 140. The FG 260 uses either network to communicate with certificate system 112. FG 260 also communicates with Fare Media (FM) 250. FG 260 can transmit FM 250 information over the local area network to local biometric validation system 266 to associate FM 250 with any biometric identifier collected at the FG 260. The local biometric validation system 266 communicates over the local area network 240 with local biometric identifier store 264 to retrieve biometric identifiers downloaded to the local biometric identifier store 264 over the local area network 240 from the central biometric validation system 118. One of skill in the art can recognize that local biometric validation system 266 can be included in the local server 224. Biometric identifiers in the local biometric identifier store 264 may correspond to the predicted biometric identifiers associated with FM 250 and account holders at the station system 130 for a given time period. One of skill in the art can recognize that local biometric identifier store 264 can be included in local data store 216. External camera 262 communicates over local area network 240 and can transmit digital images corresponding with biometric identifiers to the local biometric validation system 266 and/or the central validation system 116.

Various portable and/or handheld media with a unique identifier can be used as FM 250, whether or not the media is issued by a transit services provider. Such media can include identification cards, payment cards, personal electronic devices, bar codes and items having bar codes, contactless devices, and more. Contactless devices can include media having a unique identification code readable by access control points though near field communication signals (e.g., radio frequency signals). By way of example, but not by limitation, such contactless devices can include devices comprising radio frequency identification tags and/or radio frequency identification-tagged items, contactless payment cards (including but not limited to credit cards, prepaid cards, debit cards, or other bank cards or contactless smart cards.), contactless identification cards and/or fobs, and near field communication-enabled user devices.

FM 250 can have multiple sources of information, which may be read automatically by certain systems and devices in the transit system 100, depending on desired functionality. For contactless devices, such sources can include an integrated circuit, memory, and/or contactless interface of the device. Additionally or alternatively, contactless devices and other forms of FM 250 can include a magnetic stripe, a bar code, and/or data imprinted and/or embossed on the device, which can serve as additional sources of information. Contactless and other sources of information can serve as repositories of account information related to, for example, a financial or user account associated with the FM 250 (which may not be associated with the transit system 100).

TV machines 212 may interact directly with a FM 250 through, for example, a contactless connection 232. Although communication of the contactless connection 232 may be two way, FM 250 may simply communicate an identification code to TV machine 212. This can be done, for example, to authenticate a contactless device for use as FM 250 in the transit system 100. A contactless device does not have to be issued by a transit service provider in order to be authenticated and used as FM 250 in the transit system, as long as the information communicated by the FM 250 to the TV machine 212 (and subsequently to access control points 208 for passage in the transit system 100) serves to uniquely identify the FM 250. Such an authentication process is provided in greater detail below.

All or part of the information communicated by the FM 250 can be used as an identification code to identify the transit FM 250. This identification code can comprise one or more fields of data including or based on information such as a name, a birth date, an identification number (such as a PAN), a social security number, a driver's license number, a media access control (MAC) address, an electronic serial number (ESN), an international mobile equipment identifier (IMEI), and more. Because the identification code is unique, it can be associated with a transit user account, and utilized by a user at a TV machine 212 to access and/or update information associated with the transit user account.

In some instances, an identification code may be assigned by a transit service provider and written to the FM 250, such as an near field communication-enabled user device 280. For example, a transit application running on a near field communication-enabled phone can generate or otherwise provide an identification code to be transmitted from the phone at access control points of the transit system 100. In other instances, if TV machine 212 is utilized to enable a user to create a transit user account, the TV machine 212 may also write an identification code to an unused portion of a memory of the FM 250, such as integrated circuit chip file space on a smart card or a near field communication component on the near field communication-enabled user device 280.

Figure 3:
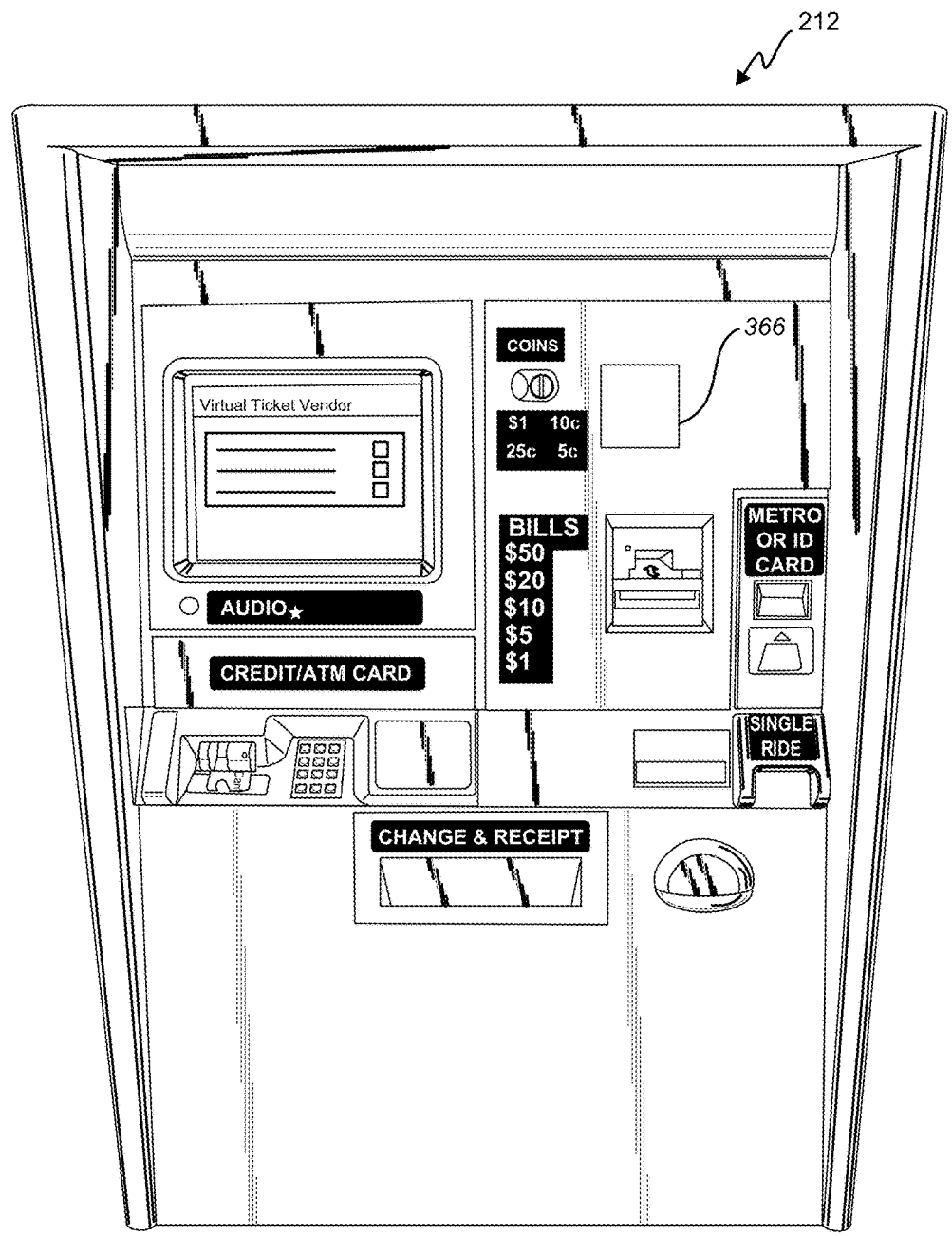
FIG. 3 is a perspective view of an embodiment of a transit vending machine.

In FIG. 3 a perspective view of an embodiment of a TV machine 212 are shown. One of ordinary skill in the art will recognize the TV machines can vary in appearance and functionality. TV machines can be much smaller and comprise fewer functional components that are pictured here and can also comprise more functional components. The TV machine 212 can facilitate the vending of tickets and the completion and performance of a transaction between the user and the station system 130. The TV machine 212 can comprise a variety of shapes and sizes and can include any desired combination multiple components. Further explanation of the function of a TV machine 212 are discussed in detail in U.S. patent application Ser. No. 13/942,366 filed on Jul. 15, 2013 entitled "ON-BOARD ONWARDS TRAVEL ENABLEMENT KIOSK," which is fully incorporated by reference herein. The TV machine 212 may contain a biometric identifier reader 366. The biometric identifier reader 366 may be a form of biometric identification reader including fingerprints, thumbprints, retina scans, palm prints, palm veins, or facial characteristic reader. The biometric identifier reader can be a digital imagery device, a scanning device, or any other form of biometric identifier reader. A FM 250 purchaser or account holder can prepopulate their biometric identifier using the biometric identifier reader 366. When this happens—the process of biometric identifier validation can be faster since the biometric identifier is already known.

Figure 4:
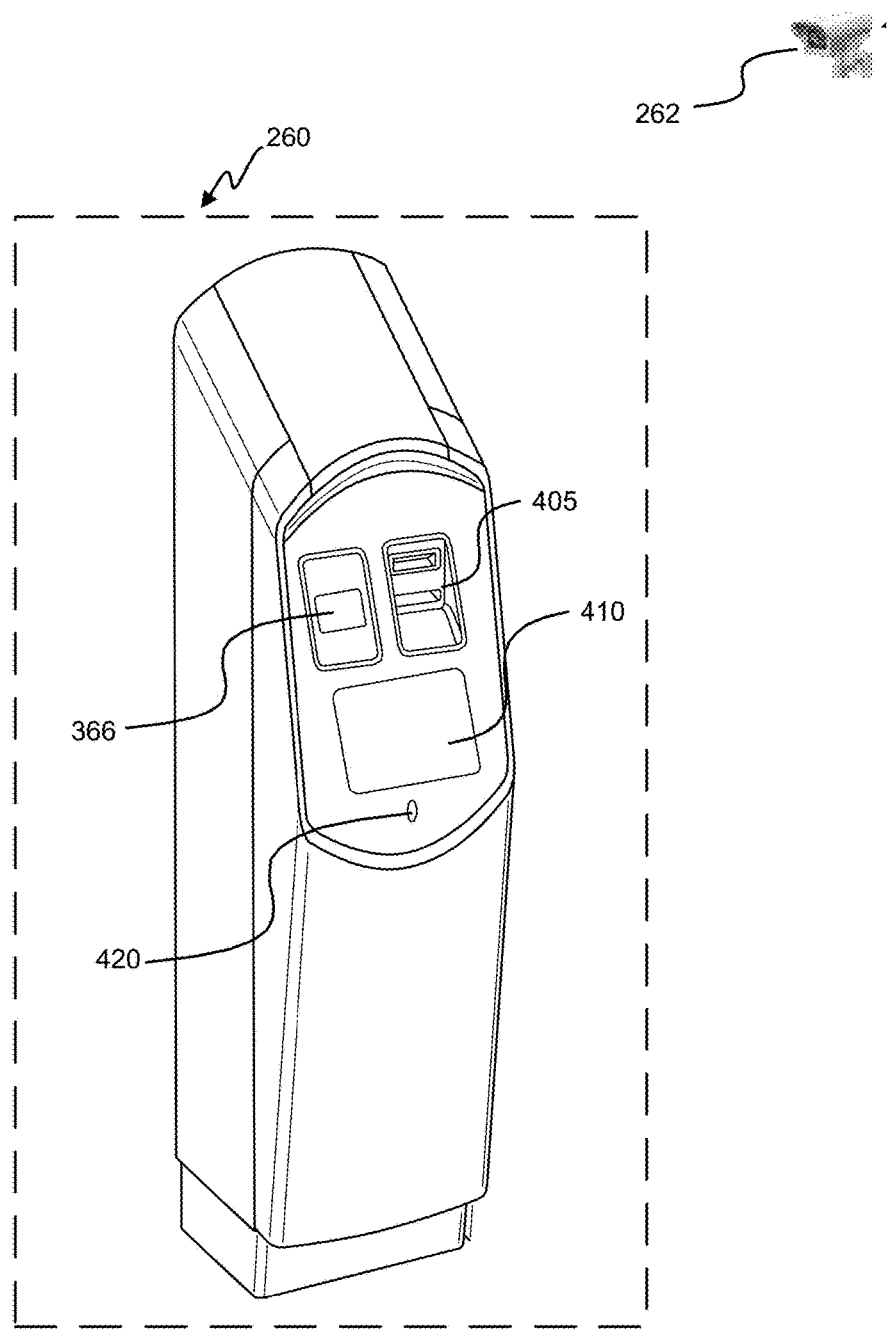
FIG. 4 is a perspective view of an embodiment of a fare gate.

Referring now to FIG. 4 that depicts in more detail the FG 260 and the external camera 262 in one embodiment of the present invention. One of ordinary skill in the art will recognize that FG 260 can vary in appearance and functionality as can external camera 262. External camera 262 can capture and transmit a facial biometric identifier over the local area network 240. FG 260 can have an audio system 420. Audio system 420 can give verbal instructions on using any of the components of FG 260. For instance, in one embodiment audio system 420 can alert the FM 250 holder that the biometric identifier associated with the FM 250 has been approved for that station system 130 during that time period such that the FM 250 holder no longer needs to use the FG 260 to use the transit option available there. Or it can notify the holder of the FM 250 that the holder has enough transactions to validate using only a biometric identifier anywhere in the system. FG 260 can contain a display system 410. For instance, in another embodiment, display system 410 can display a message for the FM 250 holder that the biometric identifier associated with the FM 250 has been approved for that station system 130 during that time period such that the FM 250 holder no longer needs to use the FG 260 to use the transit option available there. In other embodiments the display system 410 can display any manner of other messages including instructions for using FG 260, instructions for using the transit system 100, and advertising. FG 260 can also comprise a FM 250 reader 405. FG 260 can also have a biometric identifier reader 366. In some embodiments the biometric identifier 366 can be a scanner or a digital imaging device. FG 260 may also have a turnstile or other physical barrier associated with it that prevents entry until FM 250 or the biometric identifier 366 is verified.

Figure 5:
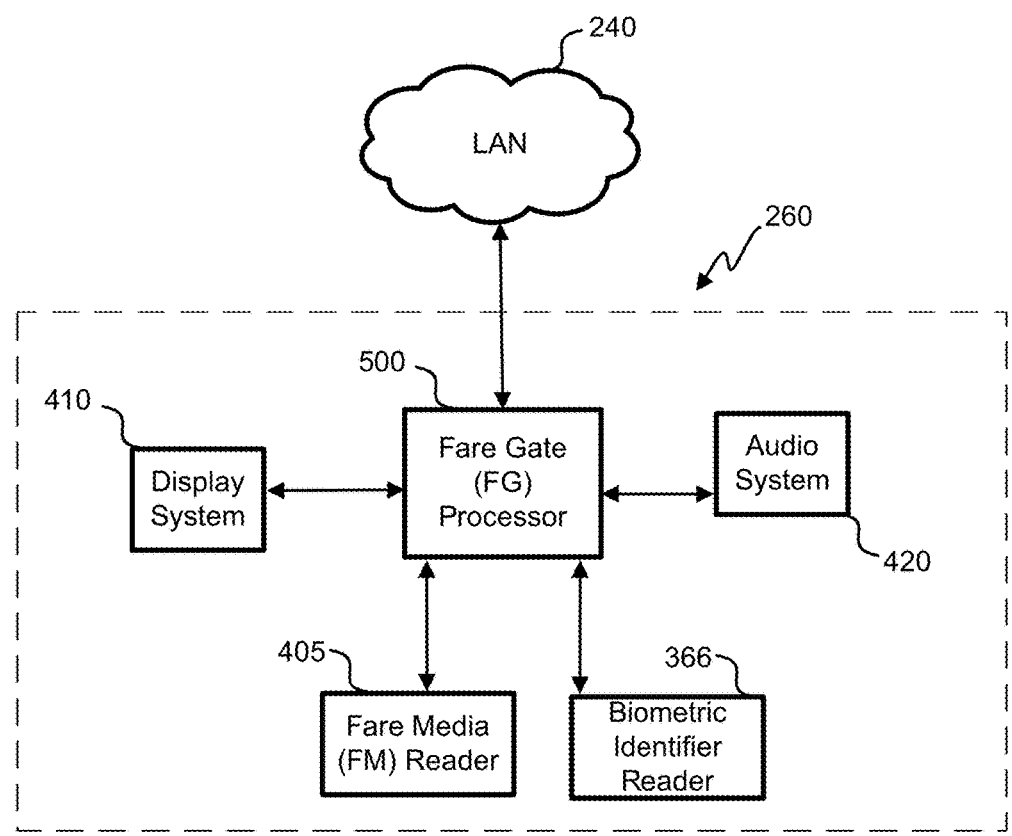
FIG. 5 is a schematic illustration of one embodiment of a fare gate.

With reference now to FIG. 5 that depicts a block diagram of components of FG 260 in one embodiment of the present invention in communication with LAN 240. In this embodiment the FG processor 500, comprising a CPU or other type of hardware processing unit including associated memory, communication, and other components as described in FIG. 12 for user device 180, communicates with the local area network 240. The FG processor can communicate with the display system 410 and provides the messaging presented on the display system 410. FG processor 500 can generate the messages to be displayed on the display system 410 or receive the message to be displayed from any number of sources over local area network 240. The FG processor 500 can communicate with the audio system 420. The FG processor 500 can generate the messages broadcast from the audio system 420 or receive the message to be broadcast from any number of sources over the local area network 240. The FG processor 500 can communicate with FM reader 405. The FG processor can determine if the FM 250 allows passage or can send the FM 250 information over the local area network 240 to make the determination. The FG processor can also communicate with the FM 250 in some embodiment directly or pass information and instructions from other sources connected to the local area network 240. The FG processor 500 also communicates with biometric identifier reader 366. The FG processor 500 passes biometric identifiers read by the biometric identifier reader 366 over the local area network to the local biometric validation system 266.

Figure 6A:
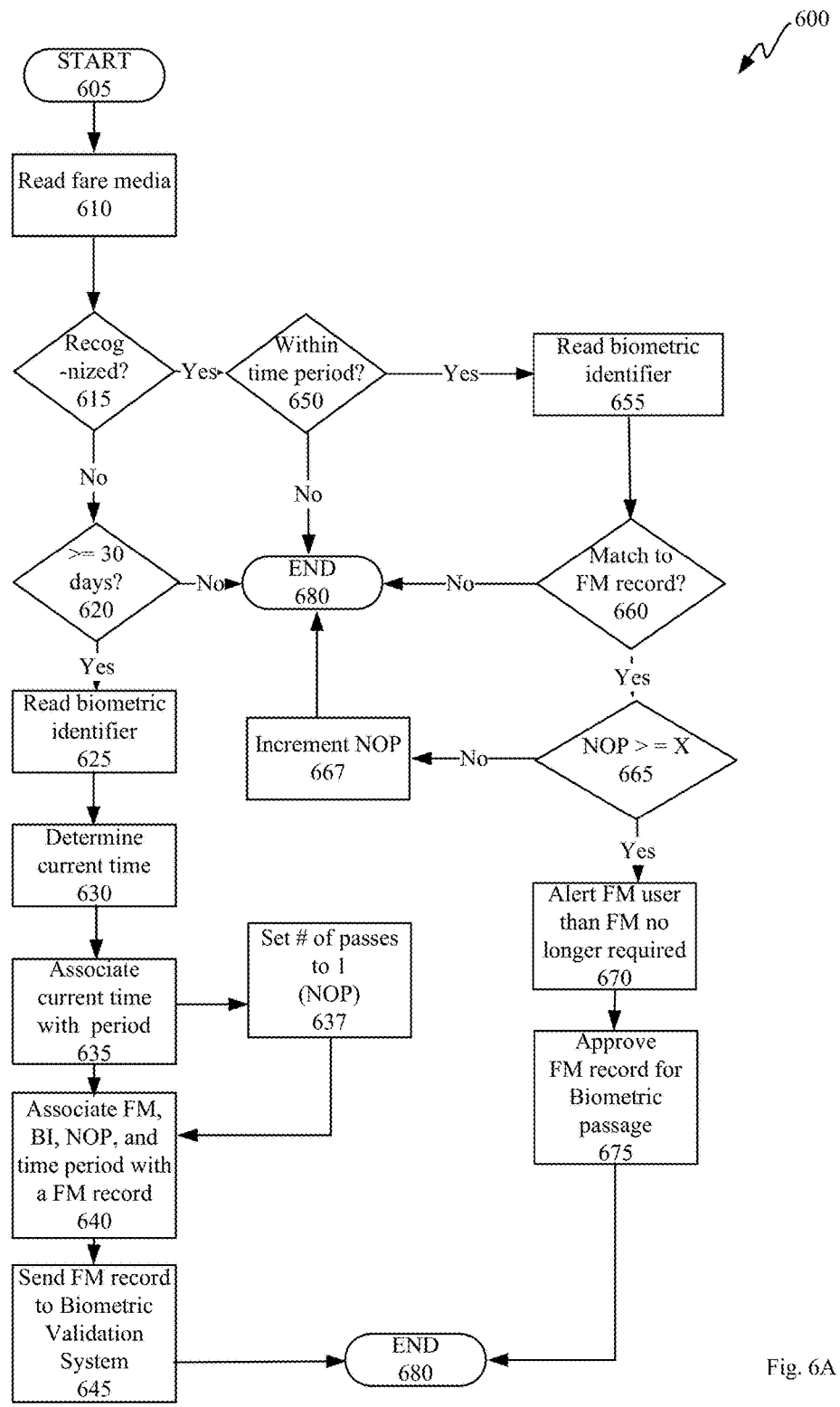
FIGS. 6A and 6B are flowcharts showing one embodiment of biometric validation for a monthly fare media holder and an another embodiment for a longer fare media holder.

With reference now to FIG. 6A, a flow chart 600 for one embodiment of the present invention depicting the biometric identifier validation learning process for user with a monthly entry system 100 pass. Starting at 605, the FG 260 (shown in FIGS. 4 and 5) reads the FM 250. At this point, the system 100 depicted in FIG. 1 must determine if FM 250 is recognized at 615. If it is, the next block 620 determines if there are 30 or more days left on the FM 250. Those of skill in the art will recognize that in other embodiments a FM 250 that expires in more or less than 30 days could be used. Further—a value based FM 250 could also be used. Once it is determined at block 620 that the FM 250 has the requisite number of days before expiration, at block 625 the biometric identifier is read. The current time is determined at block 630. At block 635 the current time is associated with a time period. One of skill in the art can recognize that this can be accomplished in many different ways. For instance, in one embodiment if the current time falls within a predetermined time period of between the hour and a half hour—then that is the time period selected. In other embodiments other time periods can be used such as 15 minute intervals. In yet other embodiments if the current time is closer to the beginning of the time period than the end, then the time period before and the current time period are associated. In this same embodiment, if the current time is closer to the end of the current time period than the beginning, both the current time period and the next time period can be associated with the current time. At block 637 a counter called number of passes (NOP) is set to one. In the next block 640, the time period, FM 250, NOP, and the biometric identifier are associated with a FM record. At the next block 645, the FM record is transmitted to the central biometric validation system 116 and stored in the central biometric identifier store 118. The process is over at the next block 680 until the FM 250 is used again. In this case the user of FM 250 passes normally through FG 260.

Referring now back to block 615, if the FM 250 is recognized as being associated with a FM record, the current time is compared to the time period in the FM record at block 650. If the current time falls within the time period associated with the FM record, the biometric identifier of the user of the FM 250 is read at block 655. At block 660, this biometric identifier is compared to the biometric identifier stored in the FM record. If it matches within predetermined constraints then at block 665 it is determined if this match has occurred a predetermined number of times, X. One of skill in the art will recognize that X is variable and can be different for different transit systems 100. In some cases, for example, it can be more than 10, exactly 10, and in others less than 10. In some cases only the first match is required. In other cases 30 or more may be required. In any case, if the threshold X is met then at block 670 the FM 250 user is alerted that the user will no longer be required to use the FM 250 to pass through to use the transit option. The FG 260 can alert the user with audio via the audio system 420, send a message to the display system 410, or use another method of alerting. At block 675 the FM record is approved for biometric identifier validation such that on the next valid time period the FM record will be sent to the local biometric identifier store 264. At block 680 the process is over and the FM 250 holder passes through FG 260. On the holder's next trip that meets the FM record criteria, the holder will not need FM 250 to pass through FG 260 or will be able to use an alternative passage for those approved for biometric identifier validation.

Any number of blocks can terminate the biometric identifier learning process. For instance, at block 650 if the current time period doesn't match the record then the process ends at block 680. One of ordinary skill in the art can recognize that instead of ending at block 680, in one embodiment the next block could be block 635 where the time period associated with the FM record is determined based on the current time. At block 660 if the biometric identifier read doesn't match the biometric identifier in the FM record then the process is over at block 680. Again—one of ordinary skill in the art can recognize that at block 660 if the biometric identifier doesn't match the biometric identifier associated with the FM record—other blocks can be taken to replace the associated biometric identifier, delete the FM record, or any other number of actions as a measure to prevent fraud or assist in the learning process. At block 665 if the NOP is not at least X then at block 667 the NOP is incremented by one. The next block 680 is the end. Once reaching this block the process at FG 260 proceeds normally.

Figure 6B:
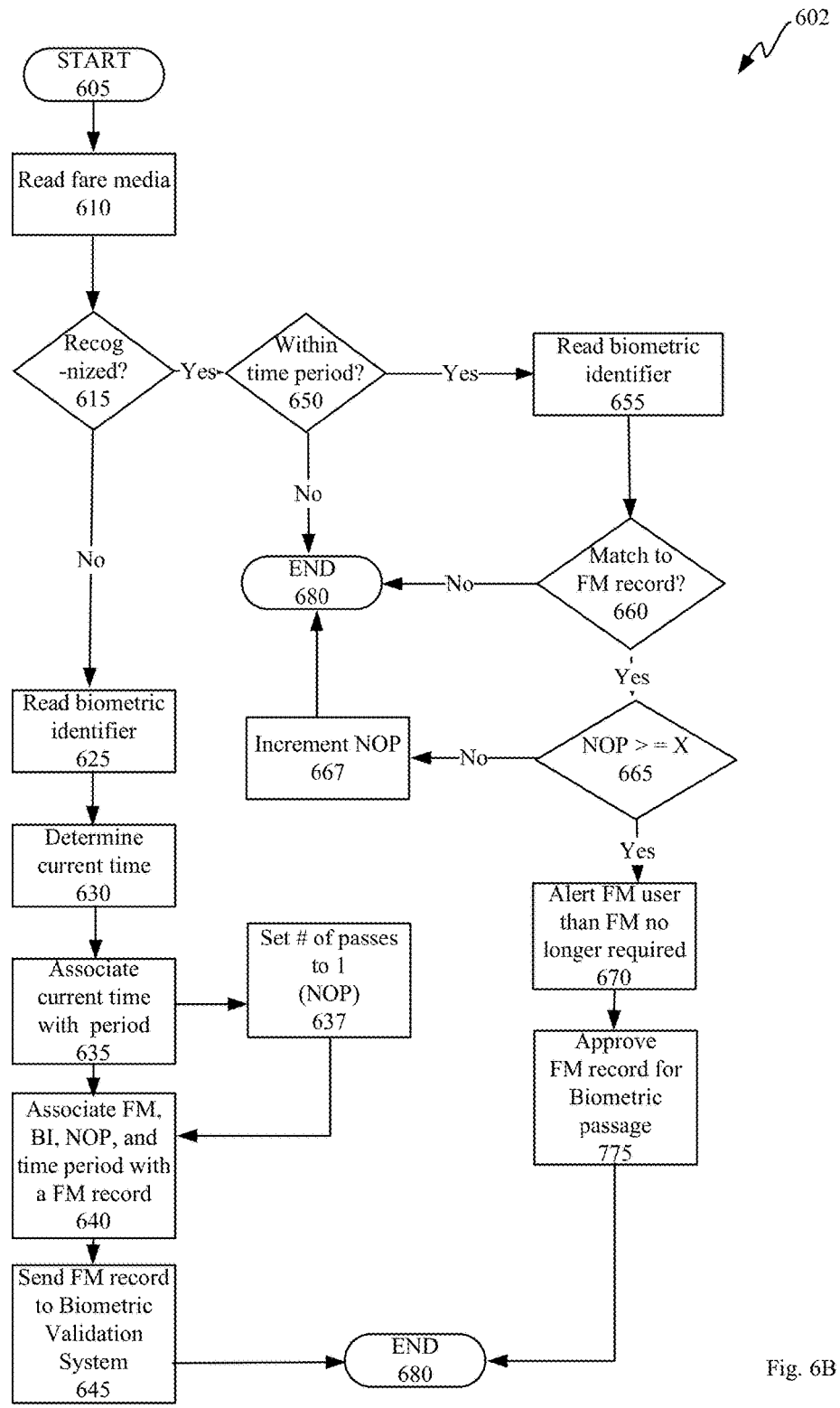

Looking now at FIG. 6B that is a flow chart 602 of an embodiment of the invention wherein the FM 250 holder is an account holder. In this instance the method follows very closely to that in FIG. 6A except that there is no block to determine how many days before expiration the FM 250 has And at block 765, the account holder can be alerted in various ways related to the information associated with the account in addition to the ways described in FIG. 6A. For instance a text or email message can be sent to the account holder.

Figure 7:
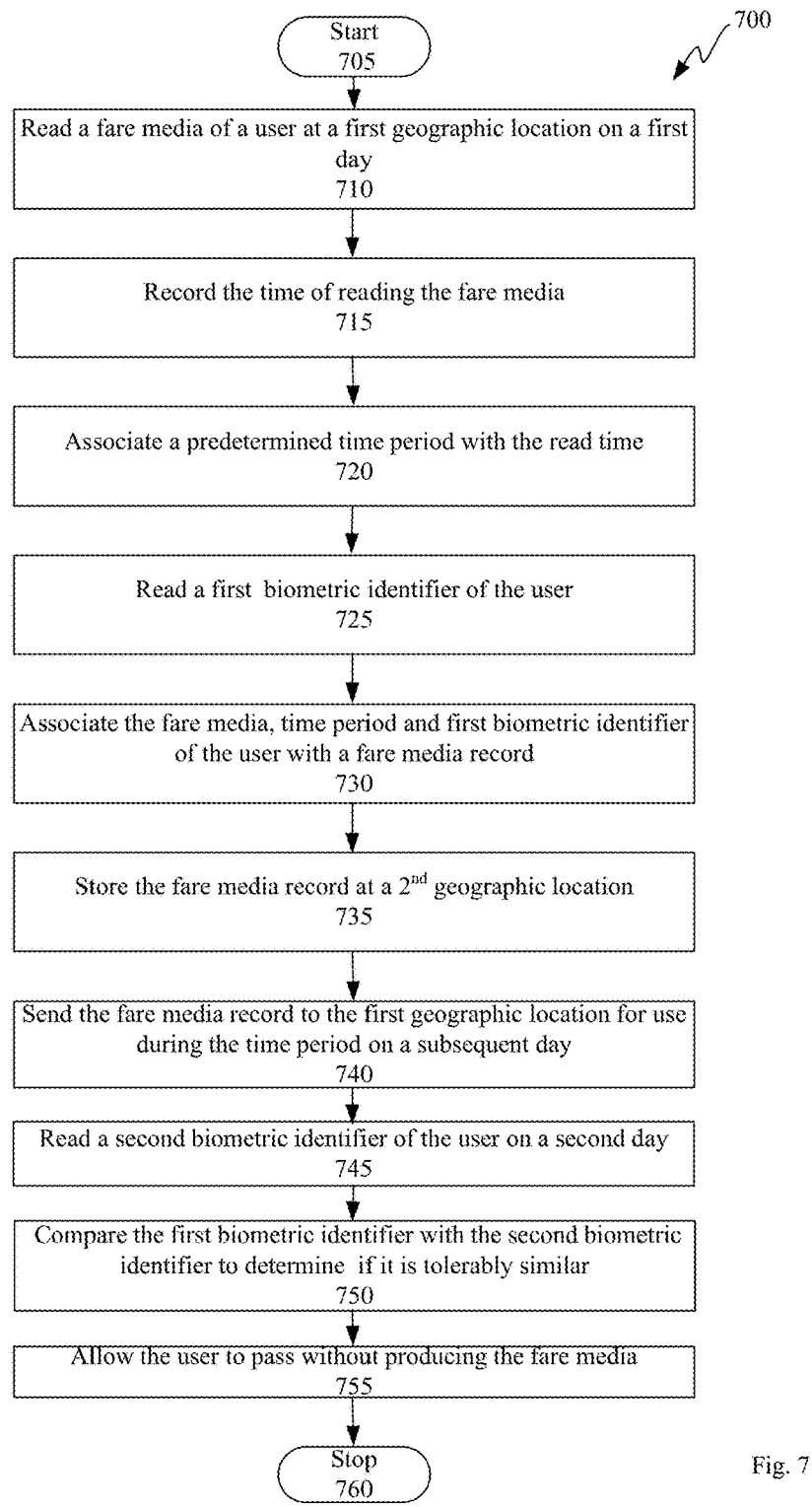
FIG. 7 is a flowchart showing one embodiment of biometric validation for a transit system account holder.

Referring now to FIG. 7, a flow chart of 700 of a method for machine-learned biometric identifier validation in an entry system. The entry system can be for a transit system, entertainment venue, sporting venue, multi-family residence, or a personal services venue—but is not limited to any of these. The biometric identifier can by on a fingerprint, palm veins, facial characteristics, DNA, a palm print, hand geometry, an iris, or a retina—but is not limited to these. The method starts at block 705. At block 710 fare media of the user is read at a first geographic location on a first day. The fare media reader can be a fare gate comprising a processor. At block 715 the time of reading the fare media is recorded by the processor. At the next block 720—a predetermined time period during any 24 hour period that the time the fare media was read is associated with the reading time. Predetermined intervals can be few minutes to a few hours and will be further explained at block 740. At block 725, the user's first biometric identifier is read. How it is read is depending on the type—for a picture is taken if it is facial characteristics or a fingerprint is scanned if that is it. At block 730 the fare media, reading time, and the first biometric identifier is associated with a record. At block 735, the fare media is stored at a second geographic location. The second geographic location can be co-located with the first geographic location or not co-located. At block 740 the fare media record is sent to the first geographic location for use during the time period on a second day. The predetermined time periods may correspond with how much memory is available and how many records are sent to a location. If there is more memory than then the predetermined time periods can be longer or more records can be sent or a combination of both. If less memory is available—then few records can be sent or the time periods are shorter or both. At block 745 the user's second biometric identifier is read on a second. At block 750 the first biometric identifier is compared to the second biometric identifier to see if they match within a predetermined tolerance. The tolerance could be less than 1%, 1%, or more than 1%—and will be determined by any number of variables including the accuracy of the biometric identifier reading device. At block 755, if the biometric identifiers are "tolerably" similar to each other—or within the predetermined tolerance—then the user is allowed to pass without presenting the fare media.

Figure 8:
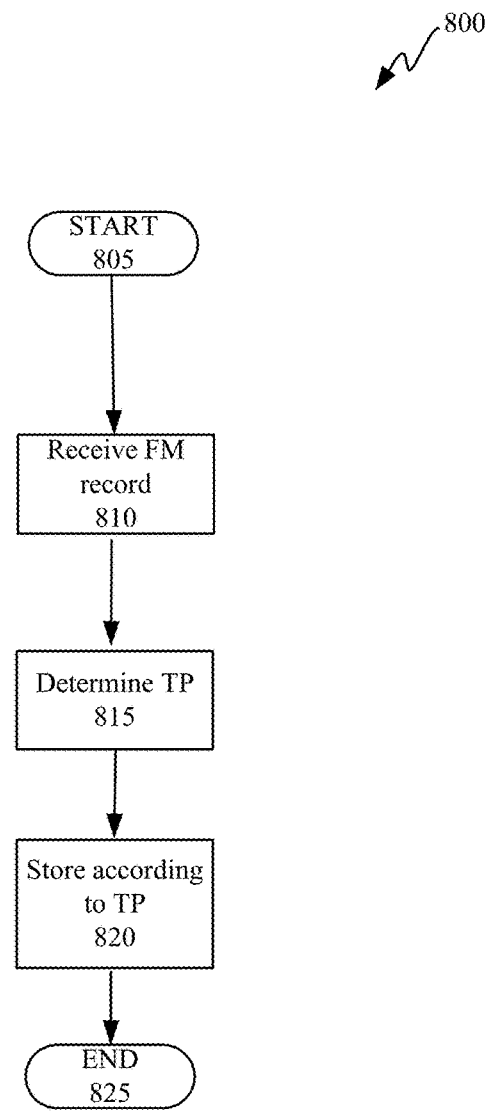
FIG. 8 is a flowchart showing one embodiment of receiving and storing fare media records with biometric identifiers.
Figure 9:
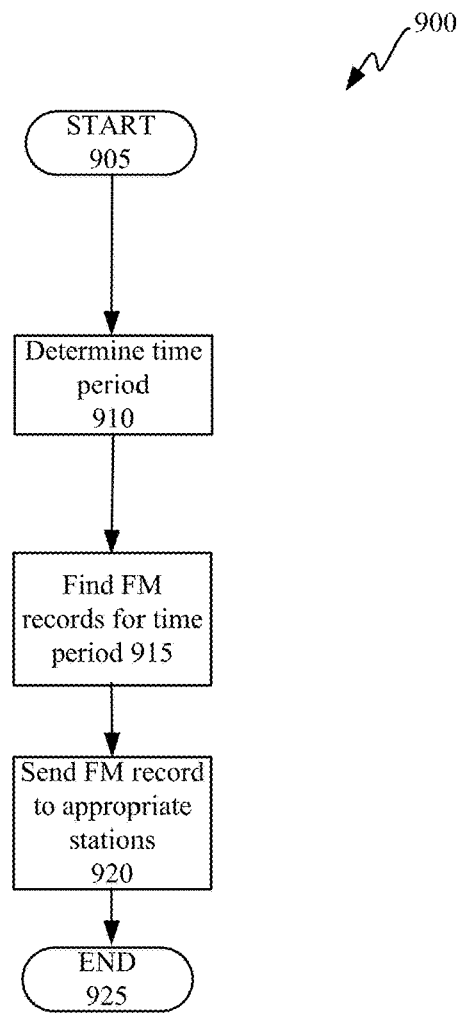
FIG. 9 is a flowchart showing one embodiment of sending biometric identifiers to a local biometric identifier store.

Referring now to FIG. 8 that shows a flow chart 800 of storing the FM record in the central data store 114 shown in FIG. 1. Starting at block 805 and proceeding to block 810 where the FM record is received. Then at block 815 the time period (TP) associated with the FM record is determined. At block 820 the FM record is stored according to the time period. It can be understood by one of skill in the art that the central biometric identifier store 118 can index FM records by any parameter including biometric identifier, FM 250, and time period. The FM record store process ends at block 825. FIG. 9 is a flow chart 900 that shows the process of populating the FM records at the local stations at the appropriate time periods when they will be needed. The process starts at block 905 and at block 910 the current time period is determined. At block 915 the FM records corresponding to the current time period are identified. At block 920 the identified FM records are sent to the appropriate local stations so that they can be used for biometric identifier validation. The process ends at block 920.

Figure 10:
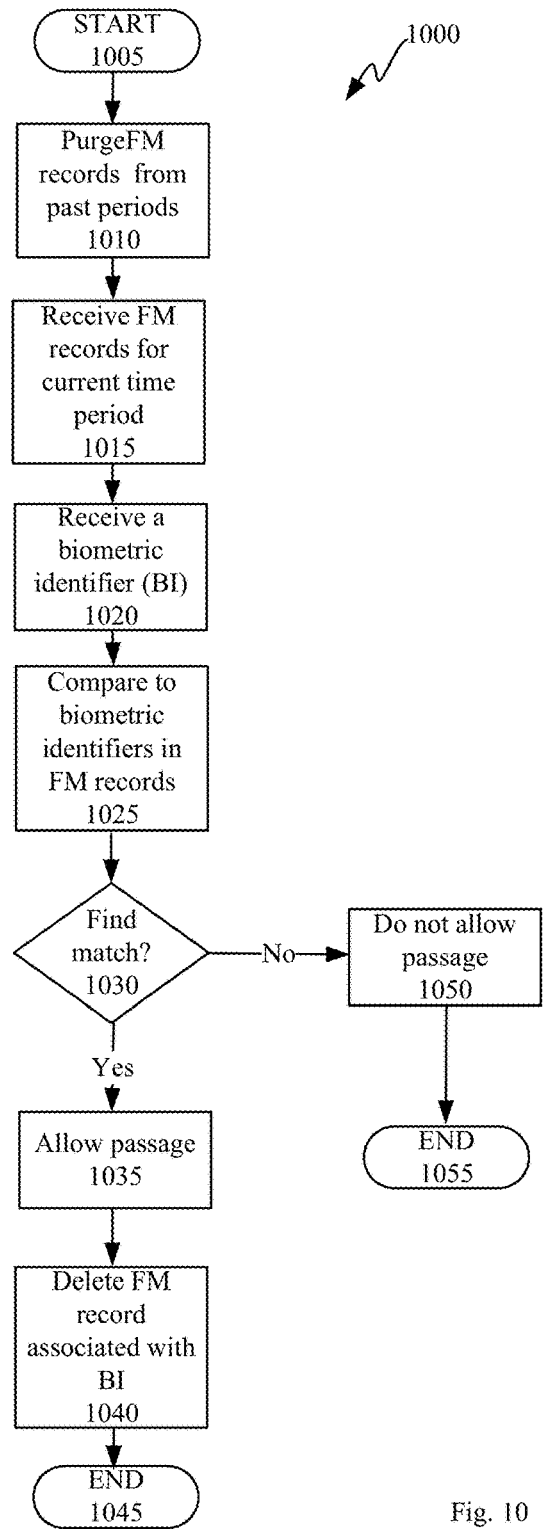
FIG. 10 is a flowchart showing one embodiment of purging past time period biometric identifiers from s local biometric identifier store.

Looking now at FIG. 10 that depicts the flow chart 1000 for validating a biometric identifier (BI) for passage in one embodiment of the present invention at a station system 130 shown in FIGS. 1 and 2. After starting at 1005 the next block is to purge FM records from the local biometric identifier store 264. Biometric identifiers typically are very large files and they take a long time to compare. Thus—the fewer predicted identifiers to match—the less memory and processing time is required. At block 1015 the FM records for the current time period are received and stored. Next at block 1020 the current biometric identifier from a traveler is received. The current biometric identifier is then compared with the biometric identifiers in the FM records at block 1025. If a match is found at block 1030, then at block 1035 the traveler is allowed passage. At block 1040 the FM record corresponding to that biometric identifier is deleted from the local biometric identifier store 264 to reduce the number of stored records and to make subsequent biometric identifier comparisons at block 1025 faster. However, in some embodiments the subsequent biometric identifier may be sent to the central biometric store 118 to be added to the fare media record of the user. In this manner the fare media record can build a history and create a confidence level in the activity of the user. At block 1045 the process ends and the traveler proceeds without producing the FM 250. If, on the other hand, a match is not found at block 1030, the traveler is denied passage at block 1050. The biometric identification process is ended for that traveler at block 1055. Any number of options might be available to the traveler at that point, including buying a FM 250 or validating the FM 250 at a FG 260 as normally would be done.

Another embodiment of the present invention is directed toward allowing an automated fare collection system to automatically trust frequently authenticated travelers by linking a biometric identifier such as their face, fingerprint or palm vein pattern to a previously purchased FM such as a Smartcard, contactless payment card, application running on a smart phone or similar anywhere in the system without learning where the user might travel. Ticket validation systems (e.g. on fare gates or standalone validators) are increasingly equipped with additional biometric authentication peripherals such as cameras (for face detection), palm vein or finger print scanners in addition to the traditional reader equipment for conventional paper tickets, smartcards, contactless payment cards etc. By detecting the biometric identifier at the same time as the FM is being validated by the passenger the system can store and link the two datasets together in a database. When this dual detection has occurred repeatedly, the system can trust the passenger implicitly and allow future passage without the passenger having to present the original FM—instead, it will use the biometric identifier as a pointer to the original FM. In this way, any fares are calculated in the same way as if the passenger had presented their FM to a validator or gate. Biometric validation is currently used for some access control applications (e.g. using fingerprint), or for id verification using data stored on passports. These rely purely on verifying the biometric data set, rather than linking it to a FM.

Figure 11A:
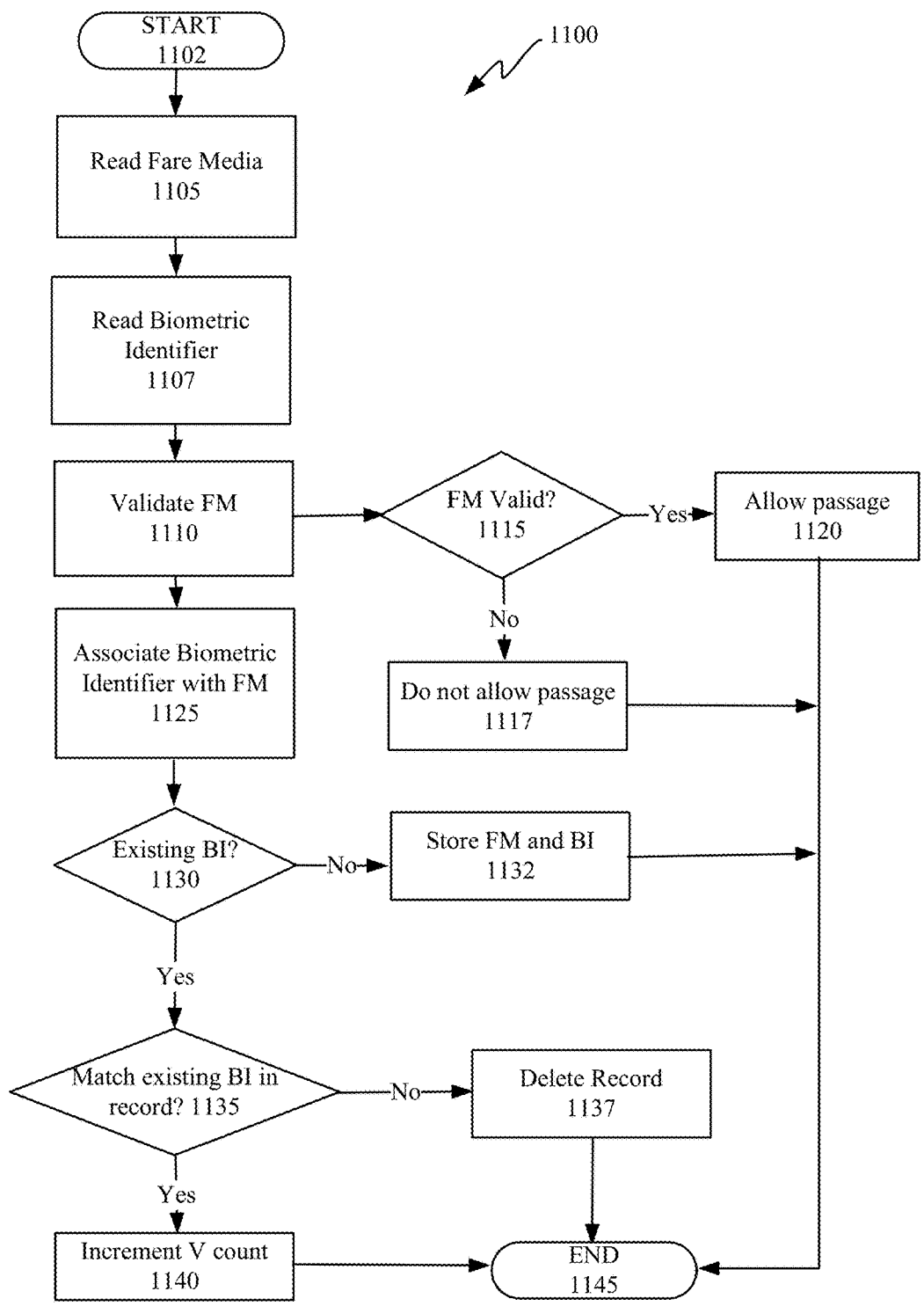
FIG. 11A is a flowchart showing one embodiment of a biometric identifier being associated with a FM in a registration phase.

With reference now to FIG. 11A, is a flowchart 1100 showing one embodiment of a biometric identifier being associated with a FM in a registration phase at any location in the system and independent of a time period. Starting with 1102 the FM is read by a FM reader at 1105. The FM can be of various types including smartcards and applications running on smart media. Next at 1107 a biometric reader such as digital camera, fingerprint scanner, iris scanner, reads a biometric identifier. The biometric identifier can include any of the previously described identifiers such as fingerprints, palm prints, vein scans, eye scans, and facial characteristics. Next at 1110 the FM is validated using normal validation processes. If it is valid a 1115, then at 1120 the FM user is allowed passage. If it is not validated, then passage is not allowed at 1117. Next at 1125 the biometric identifier is associated with the FM. In some embodiments it may be advantageous to associate the fare media with the biometric identifier without also associating the biometric identifier with the personal information with the FM user. Next at 1130 it is determined if the biometric identifier has already been recorded in the biometric data store. If not—the FM and biometric identifier are stored maintaining the association between the two at 1132. If the biometric identifier already exists then at 1135 a comparison will determine if the new biometric identifier matches the existing biometric identifier. If it does not—then at 1137 the existing biometric identifier is discarded along with the association to the FM. If the two biometric identifiers match—then a count "V" is incremented at 1140. V counts the number of times the FM is presented with a biometric identifier such that after V surpasses a threshold the FM will no longer be required in conjunction with the biometric identifier. Only the biometric identifier will be needed to validate passage.

Figure 11B:
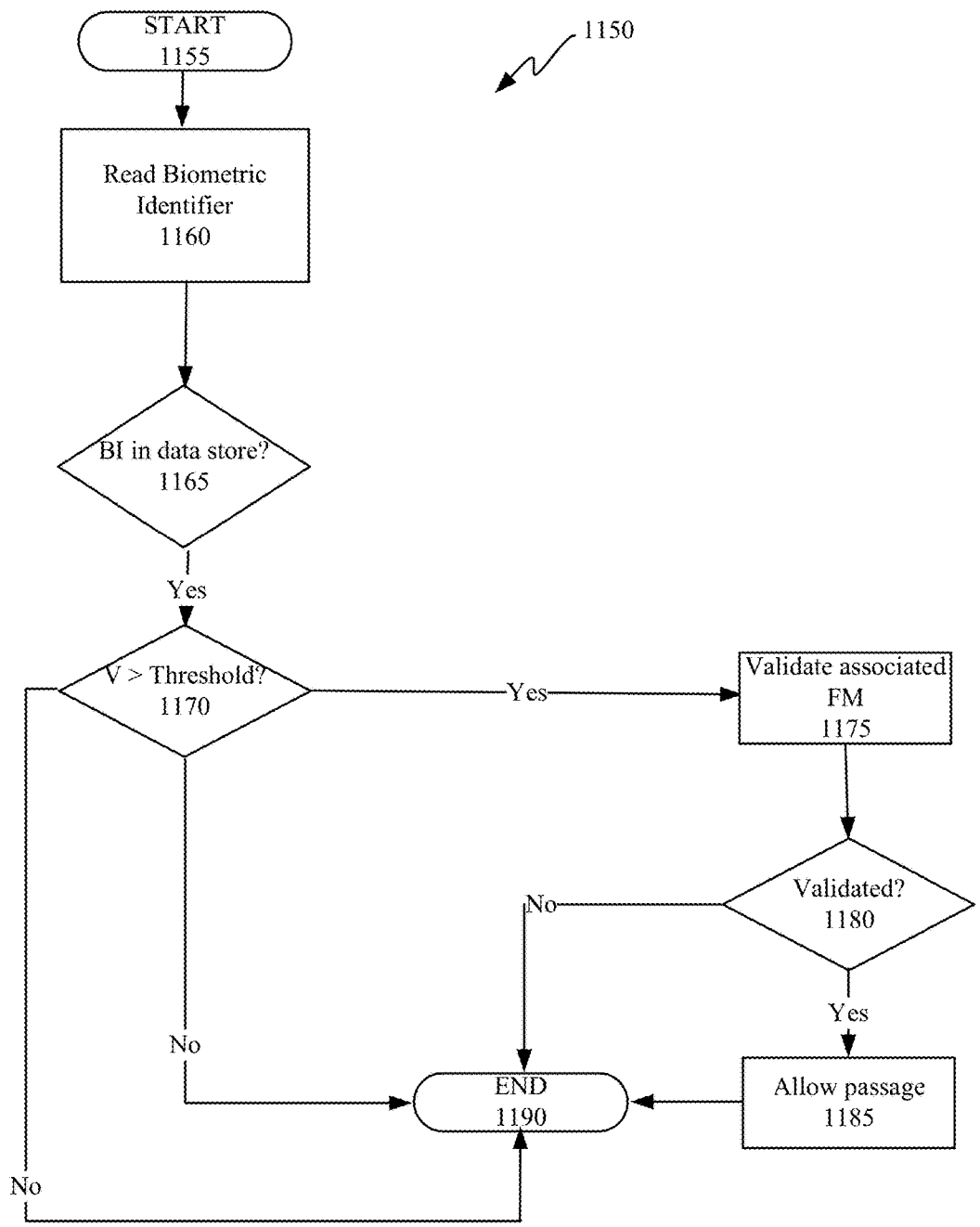
FIG. 11B is a flowchart showing one embodiment of a biometric identifier being used to allow passage at any location in the system.

With reference now to FIG. 11B, a flowchart 1150 showing one embodiment of a biometric identifier being used to allow passage at any location in the system and independent of a time period. Starting at 1155 the user biometric identifier is read at 1160. At 1165 if the biometric identifier is in the biometric identifier data store, then a 1170 the count V of the number of times the biometric identifier was validated with a FM is compared to a threshold to determine if the count V exceeds the threshold. If it does—then at 1175 the FM is retrieved to determine if passage can be validated at 1180. If passage can be validated—then the user is allowed passage at 1185. If the FM is not validated then the process ends at 1190

Figure 12:
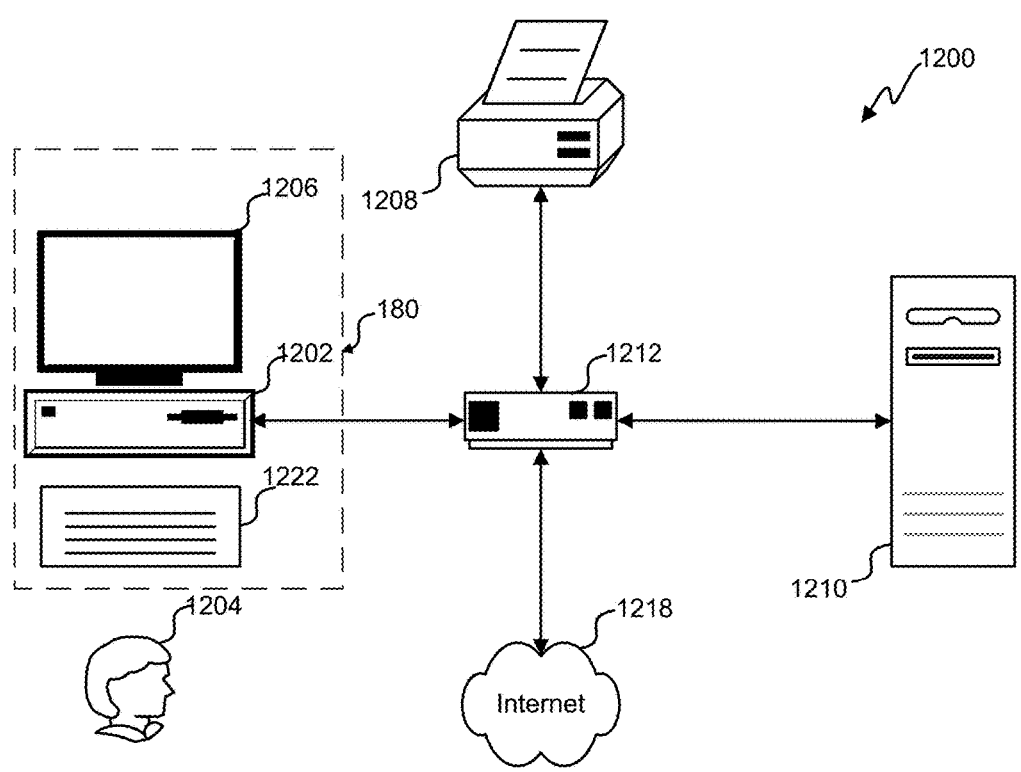
FIG. 12 depicts a block diagram of an embodiment of a computer system.

With reference now to FIG. 12, an exemplary environment with which embodiments may be implemented is shown with a user device 180 that can be used by a user 1204. The computer system 1200 can include a computer 1202, keyboard 1222, a network router 1212, a printer 1208, and a monitor 1206. The monitor 1206, processor 1202 and keyboard 1222 can be parts of user device 180, that may be a smart phone or other mobile phone (including a near-field-communication enabled mobile phone), a tablet personal computer (PC), a personal digital assistant (PDA), an e-book reader, wearable device, or other device. The monitor 1206 can be a CRT, flat screen, etc.

A user 1204 can input commands into the computer 1202 using various input devices, such as a mouse, keyboard 1222, track ball, touch screen, voice command, etc. If the computer system 1200 comprises a mainframe, a designer 1204 can access the computer 1202 using, for example, a terminal or terminal interface. Additionally, the user device 180 may be connected to a printer 1208 and a server 1210 using a network router 1212, which may connect to the Internet 1218 or a wide area network.

The server 1210 may, for example, be used to store additional software programs and data. In one embodiment, software implementing the systems and methods described herein can be stored on a storage medium in the server 1210. Thus, the software can be run from the storage medium in the server 1210. In another embodiment, software implementing the systems and methods described herein can be stored on a storage medium in the computer 1202. Thus, the software can be run from the storage medium in the user device 180. Therefore, in this embodiment, the software can be used whether or not computer 1202 is connected to network router 1212. Printer 1208 may be connected directly to computer 1202, in which case, the user device 180 can print whether or not it is connected to network router 1212.

Figure 13:
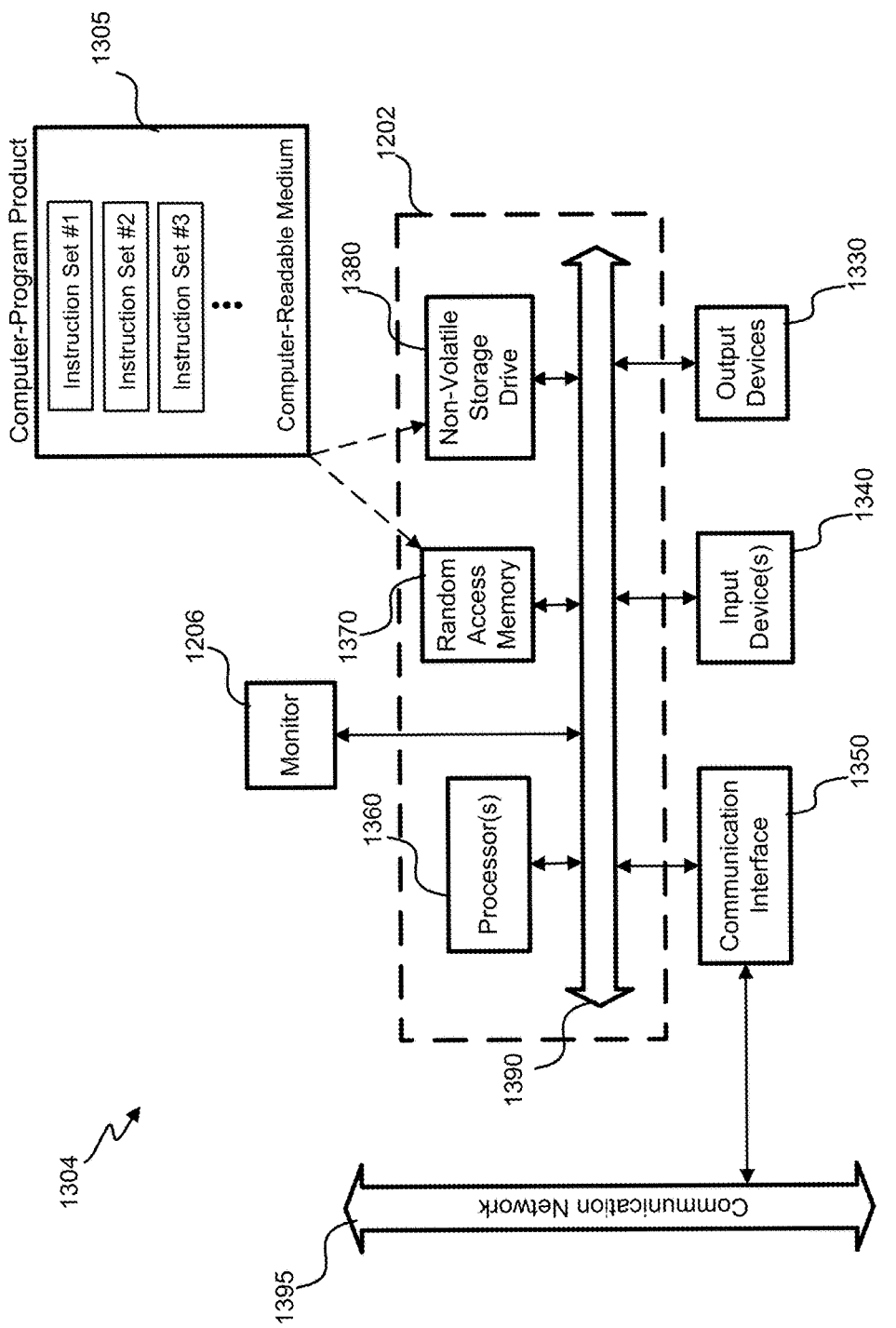
FIG. 13 depicts a block diagram of an embodiment of a special-purpose computer system.

With reference to FIG. 13, an embodiment of a special-purpose computer system 1304 is shown. The above methods may be implemented by computer-program products that direct a computer system to perform the actions of the above-described methods and components. Each such computer-program product may comprise sets of instructions (code) embodied on a computer-readable medium that directs the processor of a computer system to perform corresponding actions. The instructions may be configured to run in sequential order, or in parallel (such as under different processing threads), or in a combination thereof. After loading the computer-program products on the user device 180, it is transformed into the special-purpose computer system 1304.

Special-purpose computer system 1304 comprises a computer 1202, a monitor 1206 coupled to computer 1202, one or more additional user output devices 1330 (optional) coupled to computer 1202, one or more user input devices 1340 (e.g., keyboard, mouse, track ball, touch screen) coupled to computer 1202, an optional communications interface 1350 coupled to computer 1202, a computer-program product 1305 stored in a tangible computer-readable memory in computer 1202. Computer-program product 1305 directs system 1304 to perform the above-described methods. Computer 1202 may include one or more processors 1360 that communicate with a number of peripheral devices via a bus subsystem 1390. These peripheral devices may include user output device(s) 1330, user input device(s) 1340, communications interface 1350, and a storage subsystem, such as random access memory (RAM) 1370 and non-volatile storage drive 1380 (e.g., disk drive, optical drive, solid state drive), which are forms of tangible computer-readable memory.

Computer-program product 1305 may be stored in non-volatile storage drive 1380 or another computer-readable medium accessible to computer 1202 and loaded into memory 1370. Each processor 1360 may comprise a microprocessor, such as a microprocessor from Intel® or Advanced Micro Devices, Inc.®, or the like. To support computer-program product 1305, the computer 1202 runs an operating system that handles the communications of product 1305 with the above-noted components, as well as the communications between the above-noted components in support of the computer-program product 1305. Exemplary operating systems include Windows® or the like from Microsoft® Corporation, Solaris® from Oracle®, LINUX, UNIX, and the like.

User input devices 1340 include all possible types of devices and mechanisms to input information to computer system 1202. These may include a keyboard, a keypad, a mouse, a scanner, a digital drawing pad, a touch screen incorporated into the display, audio input devices such as voice recognition systems, microphones, and other types of input devices. In various embodiments, user input devices 1340 are typically embodied as a computer mouse, a trackball, a track pad, a joystick, wireless remote, a drawing tablet, a voice command system. User input devices 1340 typically allow a user to select objects, icons, text and the like that appear on the monitor 1206 via a command such as a click of a button or the like. User output devices 1330 include all possible types of devices and mechanisms to output information from computer 1202. These may include a display (e.g., monitor 1206), printers, non-visual displays such as audio output devices, etc.

Communications interface 1350 provides an interface to other communication networks 1395 and devices and may serve as an interface to receive data from and transmit data to other systems, wide area network s and/or the Internet 1218. Embodiments of communications interface 1350 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1350 may be coupled to a computer network, to a FireWire® bus, or the like. In other embodiments, communications interface 1350 may be physically integrated on the motherboard of computer 1202, and/or may be a software program, or the like.

RAM 1370 and non-volatile storage drive 1380 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1370 and non-volatile storage drive 1380 may be configured to store the basic programming and data constructs that provide the functionality of various embodiments of the present invention, as described above.

Software instruction sets that provide the functionality of the present invention may be stored in RAM 1370 and non-volatile storage drive 1380. These instruction sets or code may be executed by the processor(s) 1360. RAM 1370 and non-volatile storage drive 1380 may also provide a repository to store data and data structures used in accordance with the present invention. RAM 1370 and non-volatile storage drive 1380 may include a number of memories including a main random access memory (RAM) to store of instructions and data during program execution and a read-only memory (ROM) in which fixed instructions are stored. RAM 1370 and non-volatile storage drive 1380 may include a file storage subsystem providing persistent (non-volatile) storage of program and/or data files. RAM 1370 and non-volatile storage drive 1380 may also include removable storage systems, such as removable flash memory.

Bus subsystem 1390 provides a mechanism to allow the various components and subsystems of computer 1202 communicate with each other as intended. Although bus subsystem 1390 is shown schematically as a single bus, alternative embodiments of the bus subsystem may utilize multiple busses or communication paths within the computer 1202.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments. It is also the case that modules, software, or algorithms can be performed on one server, multiple servers or share the same server. A platform is a major piece of software, such as an operating system, an operating environment, or a relational database or data store, under with various smaller application programs can be designed to run. An operating system is the most important software program running on most computer systems. It manages a processors memory, processes, all of the software and programs loaded onto it, and all of the connected hardware. The operating system's job is to manage all of the software and hardware on the computer. Most of the time, there are many different software programs operating at once as well as multiple connected hardware devices. There are many operating systems—the most basic is the disk operating system or "DOS." Each type of computer or device typically has its own different operating systems. Some typical operating systems are iOS, Windows, Android, and Linux.

The networks disclosed may be implemented in any number of topologies. A network is made of many computing devices that can include computers, servers, mainframe computers, network devices, peripherals, or other devise connected together. A network allows these devices to share data and communicate with each other. The most prominent network is the Internet—that connects billions of devices all over the world. There are many types of network devices including: computers, consoles, firewalls, hubs, routers, smartphones, switches, wearables, watches, and cameras. Networks are set up in many different ways referred to as network topologies. Some of the most common topologies include tree, hybrid, ring, mesh star, and bus. The tree topology is the generally used topology. A computer is typically an electronic device for storing and processing data according to instruction it reads. A console is a text entry and display device. A firewall is network security system, either hardware- or software-based, that controls incoming and outgoing network traffic based on a set of rules, and acts as a barrier between a trusted network and other untrusted networks—such as the Internet—or less-trusted networks—a firewall controls access to the resources of a network through a positive control model. This means that the only traffic allowed onto the network defined in the firewall policy is; all other traffic is denied. A hub is a connection point for multiple devices in a network. A hub typically has multiple ports such that if packets of data arrive at one port they are copied to the other ports. A router is a device that forwards data packets along the network. A router connects two or more networks such as an intranet to the internet. Routers use headers and forwarding tables to determine how data packets should be sent using certain paths in the network. The typical router protocol using ICMP to communicate and configure the best path. A network switch is different from a router. Switches serve as controllers that enable networked devices to communicate with each other. Switches create networks while routers connect networks together.

Networks operate on the seven layer open system interconnection (OSI) model. The OSI model defines a conceptual networking framework to implement protocols and divides the task of networking into a vertical stack of the seven layers. In the OSI model, communication control is passed through the layers from the first to the seventh layer. The first or "top" layer is the "physical" layer. Layer 1 transmits the bit stream of ones and zeros indicated by electrical impulse, light, or radio frequency signals—thus providing a method of interacting with actual hardware in a meaningful way. Examples of the physical layer include Ethernet, FDDI, B8ZS, V.35, V.24, and RJ45. The second layer is called the Data Link layer. At layer 2 data packets are encoded and decoded into a bit stream in compliance with transmission protocols that control flow control and frame synchronization. The Data Link layer 2 is actually a combination of two different layers: the Media Access Control (MAC) layer and the Logical Link Control (LLC) layer. The MAC layer controls a computer's access to the network. The LLC basically controls frame synchronization, flow control, and various types of error correction. Examples of the Data Link layer include PPP, FDDI, ATM, IEEE 802.5/802.2, IEEE 802.3/802.2, HDLC, and Frame Relay. The third OSI layer, called the "Network" layer, provides the switching and routing technology to create logical paths to transmit data from one node to another in the network. Layer. The Network layer also performs the function of routing, forwarding, addressing, internetworking, error handling, congestion control, and packet sequencing. Layer 3 examples include AppleTalk, DDP, IP, and IPX. The fourth OSI layer is the Transport layer. Layer 4 provides transparent transfer of data between devices. Layer 4 also performs error recovery and provides flow control for complete data transfer. Examples of layer 4 include SPX, TCP, and UDP. OSI layer 5 called the Session layer because it manages and terminates the connections between different applications. The Session layer coordinates communication between applications. It sets up communications and terminates the communications between applications at each end—establishing and ending a "session." Examples include NFS, NetBios, names, RPC, and SQL. Layer 6 is called the Presentation Layer. Layer 6 is really the "transformation" layer—transforming data from the final layer to a format the network understands and vice versa. Layer 6 formats and encrypts data sent on the network and decrypts the data from the network. Examples include ASCII, EBCDIC, TIFF, GIF, PICT, JPEG, MPEG, and MIDI. Finally, the last layer 7, is called the Application Layer. Everything at this layer is specific to applications, and this layer provides the services for email, file transfers, and other network applications. Examples include WWW browsers, NFS, SNMP, FTP, Telnet, and HTTP.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), complex instruction set computers (CISCs), reduced instruction set computers (RISCs), advanced RISC machines (ARMs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. A processor is implemented in logic circuitry that includes the basic functions of AND, NAND, OR, and NOR functions. The circuitry responds to the basic instructions that operate an computing device. In some computing devices the processor is actually referred to a as microprocessor. Functionally, processors are typically composed of RAM as well as address and data buses, the processing circuitry and accumulators. The busses supply the data and programming instructions from RAM, ROM, CACHE, or other memory to the processing circuitry. The speed of a processor depends both on the speed of the processing circuitry as well as the speed of the data and address busses that supply the circuitry. And the speed of the data and address buses are also gated by the speed of the RAM. It is critical that all of these components have speeds that are matched to one another to maximize processor performance. Processors use machine level instruction codes to manipulate data. Other instructions must be compiled to machine level instructions to for the processor to perform the operations. Dual core processors have dual processing circuitry and multiple address and data buses.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing data. The term "machine-readable medium" includes, but is not limited to portable or fixed storage devices, optical storage devices, and/or various other storage mediums capable of storing that contain or carry instruction(s) and/or data. Cache memory, also called the central processing unit (CPU) memory, is random access memory that the processor can access more quickly than standard RAM. Cache memory is typically integrated into the circuitry with the processing unit, but sometimes can be placed on a separate chip. The principle purpose of cache memory is to store the program instruction for the operational software such as an operating systems. Most long running software instructions reside in cache memory if they are accessed often.

While the principles of the disclosure have been described above in connection with specific apparatuses and methods, it is to be clearly understood that this description is made only by way of example and not as limitation on the scope of the disclosure.

What is claimed is:

1. A computer processor implemented method for biometric identifier validation at an entry system, comprising:
   registering, by a processor, a biometric identifier with a fare media by:
      receiving a first fare media presentation from a first fare media reader at a first time and at a first geographical location;
      receiving a first biometric identifier from a first biometric identifier reader at the first time and at the first geographical location;
      opening a first fare gate after determining the first fare media presentation is valid;
      comparing the first biometric identifier with a stored biometric identifier, wherein the stored biometric identifier is associated with the first fare media presentation, and wherein fare media data of the stored biometric identifier is associated with the first fare media presentation;
      determining the first biometric identifier matches the stored biometric identifier;
      in response to the determining the first biometric identifier matches the stored biometric identifier, incrementing a match count, wherein the match count corresponds to a number of times a received biometric identifier matches the stored biometric identifier associated with the fare media;
      receiving a second fare media presentation from a second fare media reader at a second time and at a second geographical location;
      receiving a second biometric identifier from a second biometric identifier reader at the second time and at the second geographical location;
      opening a second fare gate after determining the second fare media presentation is valid;
      comparing the second biometric identifier with the stored biometric identifier, wherein the stored biometric identifier is associated with the second fare media presentation, and wherein the fare media data of the stored biometric identifier is associated with the second fare media presentation;
      determining the second biometric identifier matches the stored biometric identifier; and
      in response to the determining the second biometric identifier matches the stored biometric identifier, incrementing the match count;
   receiving a third biometric identifier at a third biometric identifier reader at a third time at a third geographical location;
   comparing, by the processor, the third biometric identifier to the stored biometric identifier;

determining, by the processor, the third biometric identifier matches the stored biometric identifier;
in response to the determining the third biometric identifier matches the stored biometric identifier:
retrieving the fare media data and the match count corresponding to the stored biometric identifier; and
determining, by the processor, the match count exceeds a threshold count;
in response to determining the match count exceeds the threshold count, validating the fare media from the retrieved fare media data; and
in response to validating the fare media from the retrieved fare media data, automatically opening, by the processor, a third fare gate for a user corresponding to the third biometric identifier by removing a physical barrier or opening a turnstile.

2. The method of claim 1, wherein the entry system is for a transit system, entertainment venue, sporting venue, multi-family residence, or a personal services venue.

3. The method of claim 1, wherein the first biometric identifier is one of a fingerprint, palm veins, facial characteristics, DNA, a palm print, hand geometry, an iris, or a retina.

4. The method of claim 1, wherein the first biometric identifier matches the stored biometric identifier when the first biometric identifier is compared with the stored biometric identifier and a difference between the first biometric identifier and the stored biometric identifier is within a predetermined constraint.

5. The method of claim 1, wherein the first geographic location, the second geographic location, and the third geographic location are at a same location.

6. The method of claim 1, wherein the third biometric identifier is added to the stored biometric identifier.

7. A non-transitory computer-readable medium having sets of instructions stored thereon for biometric identifier validation in an entry system which, when executed by a computer, cause the computer to perform the actions of:
registering a biometric identifier with a fare media by:
receiving a first fare media presentation from a first fare media reader at a first time and at a first geographical location;
receiving a first biometric identifier from a first biometric identifier reader at the first time and at the first geographical location;
opening a first fare gate after determining the first fare media presentation is valid;
comparing the first biometric identifier with a stored biometric identifier, wherein the stored biometric identifier is associated with the first fare media presentation, and wherein fare media data of the stored biometric identifier is associated with the first fare media presentation;
determining the first biometric identifier matches the stored biometric identifier;
in response to the determining the first biometric identifier matches the stored biometric identifier, incrementing a match count, wherein the match count corresponds to a number of times a received biometric identifier matches the stored biometric identifier associated with the fare media;
receiving a second fare media presentation from a second fare media reader at a second time and at a second geographical location;
receiving a second biometric identifier from a second biometric identifier reader at the second time and at the second geographical location;
opening a second fare gate-after determining the second fare media presentation is valid;
comparing the second biometric identifier with the stored biometric identifier, wherein the stored biometric identifier is associated with the second fare media presentation, and wherein the fare media data of the stored biometric identifier is associated with the second fare media presentation;
determining the second biometric identifier matches the stored biometric identifier; and
in response to the determining the second biometric identifier matches the stored biometric identifier, incrementing the match count;
receiving a third biometric identifier at a third biometric identifier reader at a third time at a third geographical location;
comparing the third biometric identifier to the stored biometric identifier;
determining the third biometric identifier matches the stored biometric identifier;
in response to the determining the third biometric identifier matches the stored biometric identifier:
retrieving the fare media data and the match count corresponding to the stored biometric identifier; and
determining the match count exceeds a threshold count;
in response to determining the match count exceeds the threshold count, validating the fare media from the retrieved fare media data; and
in response to validating the fare media from the retrieved fare media data, automatically opening a third fare gate for a user corresponding to the third biometric identifier by removing a physical barrier or opening a turnstile.

8. The non-transitory computer-readable medium of claim 7, wherein the entry system is for a transit system, entertainment venue, sporting venue, multi-family residence, or a personal services venue.

9. The non-transitory computer-readable medium of claim 7, wherein the first biometric identifier is one of a fingerprint, palm veins, facial characteristics, DNA, a palm print, hand geometry, an iris, or a retina.

10. The non-transitory computer-readable medium of claim 7, wherein the first biometric identifier matches the stored biometric identifier when the first biometric identifier is compared with the stored biometric identifier and a difference between the first biometric identifier and the stored biometric identifier is within a predetermined constraint.

11. The non-transitory computer-readable medium of claim 7, wherein the first geographic location, the second geographic location, and the third geographic location are at a same location.

12. The non-transitory computer-readable medium of claim 7, wherein the third biometric identifier is added to the stored biometric identifier.

13. The non-transitory computer-readable medium of claim 7, wherein the sets of instructions when executed by the computer further cause the computer to perform the actions of:
determining the first biometric identifier does not match the stored biometric identifier;
associating the fare media with the first biometric identifier;
storing the fare media data;
deleting the stored biometric identifier; and
storing the first biometric identifier as the stored biometric identifier.

14. A system for biometric identifier validation in an entry system, the system comprising:
a fare gate processor configured to:
register a biometric identifier with a fare media by:
receive a first fare media presentation from a first fare media reader at a first time and at a first geographical location;
receive a first biometric identifier from a first biometric identifier reader at the first time and at the first geographical location;
open a first fare gate after determining the first fare media presentation is valid;
compare the first biometric identifier with a stored biometric identifier, wherein the stored biometric identifier is associated with the first fare media presentation, and wherein fare media data of the stored biometric identifier is associated with the first fare media presentation;
determine the first biometric identifier matches the stored biometric identifier;
in response to determining the first biometric identifier matches the stored biometric identifier, increment a match count, wherein the match count corresponds to a number of times a received biometric identifier matches the stored biometric identifier associated with the fare media;
receive a second fare media presentation from a second fare media reader at a second time and at a second geographical location;
receive a second biometric identifier from a second biometric identifier reader at the second time and at the second geographical location;
open a second fare gate-after determining the second fare media presentation is valid;
compare the second biometric identifier with the stored biometric identifier, wherein the stored biometric identifier is associated with the second fare media presentation, and wherein the fare media data of the stored biometric identifier is associated with the second fare media presentation;
determine the second biometric identifier matches the stored biometric identifier; and
in response to the determining the second biometric identifier matches the stored biometric identifier, increment the match count;
receive a third biometric identifier at a third biometric identifier reader at a third time at a third geographical location;
compare the third biometric identifier to the stored biometric identifier;
determine the third biometric identifier matches the stored biometric identifier;
in response to the determining the third biometric identifier matches the stored biometric identifier:
retrieve the fare media data and the match count corresponding to the stored biometric identifier; and
determine the match count exceeds a threshold count;
in response to determining the match count exceeds the threshold count, validating the fare media from the retrieved fare media data; and
in response to validating the fare media from the retrieved fare media data, automatically opening a third fare gate for a user corresponding to the third biometric identifier by removing a physical barrier or opening a turnstile.

15. The system of claim 14, wherein the entry system is for a transit system, entertainment venue, sporting venue, multi-family residence, or a personal services venue.

16. The system of claim 14, wherein the first biometric identifier is one of a fingerprint, palm veins, facial characteristics, DNA, a palm print, hand geometry, an iris, or a retina.

17. The system of claim 14, wherein the first biometric identifier matches the stored biometric identifier when the first biometric identifier is compared with the stored biometric identifier and a difference between the first biometric identifier and the stored biometric identifier is within a predetermined constraint.

18. The system of claim 14, wherein the second biometric identifier is added to the stored biometric identifier.

19. The system of claim 14, wherein the fare gate processor is further configured to:
determine the first biometric identifier does not match the stored biometric identifier;
associate the fare media with the first biometric identifier;
store the fare media data;
delete the stored biometric identifier; and
store the first biometric identifier as the stored biometric identifier.

20. The system of claim 14, wherein the first geographical location, the second geographical location, and the third geographical location are at a same location.

* * * * *